(12) United States Patent
Zhang

(10) Patent No.: US 12,216,839 B2
(45) Date of Patent: Feb. 4, 2025

(54) PAIRING METHOD AND PAIRING SYSTEM

(71) Applicant: HONOR DEVICE CO., LTD., Shenzhen (CN)

(72) Inventor: Beihang Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/273,741

(22) PCT Filed: Jan. 14, 2022

(86) PCT No.: PCT/CN2022/072016
§ 371 (c)(1),
(2) Date: Jul. 21, 2023

(87) PCT Pub. No.: WO2022/193811
PCT Pub. Date: Sep. 22, 2022

(65) Prior Publication Data
US 2024/0176403 A1 May 30, 2024

(30) Foreign Application Priority Data

Mar. 15, 2021 (CN) .......................... 202110293428.X
Apr. 1, 2021 (CN) .......................... 202110357928.5

(51) Int. Cl.
*G06F 3/0354* (2013.01)
*G06F 1/16* (2006.01)
(Continued)

(52) U.S. Cl.
CPC ........ *G06F 3/03545* (2013.01); *G06F 1/1607* (2013.01); *G06F 1/1698* (2013.01);
(Continued)

(58) Field of Classification Search
CPC ...... G06F 1/1698; G06F 1/266; G06F 3/0231; G06F 3/03545; G06F 3/04162;
(Continued)

(56) References Cited

U.S. PATENT DOCUMENTS 9,977,519 B2 * 5/2018 Lukanc ............... G06F 3/03545
10,210,743 B2 2/2019 Yang et al.
(Continued)

FOREIGN PATENT DOCUMENTS

| CN | 103135859 A | 6/2013 |
| CN | 106201026 A | 12/2016 |

(Continued)

OTHER PUBLICATIONS

Zhang Likun;"Development of Bluetooth pairing module based on near field communication technology";Dissertation for the Master Degree;Heilongjiang University;May 15, 2016;68pages(with English abstract).

*Primary Examiner* — Ibrahim A Khan
(74) *Attorney, Agent, or Firm* — WOMBLE BOND DICKINSON (US) LLP

(57) ABSTRACT

Embodiments of this application provide a pairing method and a pairing system. The pairing system includes a stylus, a wireless keyboard, and an electronic device. The stylus includes a first coil, and the wireless keyboard includes a second coil. The method includes: In response to that the wireless keyboard charges the stylus through the second coil and the first coil, the stylus sends a pairing request to the wireless keyboard through the first coil and the second coil. The wireless keyboard sends the pairing request to the electronic device. The electronic device displays a pairing dialog box based on the pairing request, where the pairing dialog box is used to prompt a user to trigger the electronic device and the stylus to perform pairing.

20 Claims, 17 Drawing Sheets

(51) Int. Cl.

| | |
|---|---|
| *G06F 1/26* | (2006.01) |
| *G06F 3/02* | (2006.01) |
| *G06F 3/023* | (2006.01) |
| *G06F 3/038* | (2013.01) |
| *G06F 3/041* | (2006.01) |
| *G06F 3/044* | (2006.01) |
| *G06F 3/04842* | (2022.01) |
| *G06F 3/04883* | (2022.01) |
| *G06F 40/166* | (2020.01) |
| *H02J 7/34* | (2006.01) |
| *H02J 50/10* | (2016.01) |
| *H02J 50/80* | (2016.01) |
| *H04W 72/21* | (2023.01) |
| *H04W 72/23* | (2023.01) |

(52) U.S. Cl.
CPC .............. *G06F 1/266* (2013.01); *G06F 3/021* (2013.01); *G06F 3/0231* (2013.01); *G06F 3/038* (2013.01); *G06F 3/0383* (2013.01); *G06F 3/0412* (2013.01); *G06F 3/04162* (2019.05); *G06F 3/0441* (2019.05); *G06F 3/0442* (2019.05); *G06F 3/04842* (2013.01); *G06F 3/04883* (2013.01); *G06F 40/166* (2020.01); *H02J 7/342* (2020.01); *H02J 50/10* (2016.02); *H02J 50/80* (2016.02); *H04W 72/21* (2023.01); *H04W 72/23* (2023.01); *G06F 3/0202* (2013.01); *G06F 2200/1632* (2013.01); *G06F 2203/0384* (2013.01)

(58) Field of Classification Search
CPC ............. G06F 3/021; G06F 2200/1632; G06F 2203/0384; H02J 50/10
See application file for complete search history.

(56) References Cited

U.S. PATENT DOCUMENTS

| | | | |
|---|---|---|---|
| 10,353,492 | B2 | 7/2019 | Chan et al. |
| 10,642,385 | B1* | 5/2020 | Song ................... G06F 1/1632 |
| 10,659,589 | B2* | 5/2020 | Jeganathan ....... H04M 1/72412 |
| 11,038,366 | B2* | 6/2021 | Kang ........................ H02J 50/10 |
| 11,132,072 | B2* | 9/2021 | Jeon ....................... G06F 3/0482 |
| 11,397,481 | B2 | 7/2022 | Kwon et al. |
| 2013/0141391 | A1 | 6/2013 | Jang, Jr. et al. |
| 2014/0043245 | A1* | 2/2014 | Dowd ................. G06F 3/04883 345/173 |
| 2014/0256250 | A1* | 9/2014 | Cueto ...................... H04B 5/72 455/41.1 |
| 2014/0373123 | A1* | 12/2014 | Kang ...................... H04L 41/22 715/736 |
| 2015/0015492 | A1* | 1/2015 | Lee ........................ G06F 1/1656 345/168 |
| 2015/0355734 | A1* | 12/2015 | Lo .......................... G06F 3/0383 345/179 |
| 2015/0372746 | A1* | 12/2015 | Xie ........................ H04W 4/80 455/11.1 |
| 2015/0382134 | A1* | 12/2015 | Lin ...................... G06F 3/03543 455/41.2 |
| 2017/0055110 | A1* | 2/2017 | Tian ........................ G06F 3/014 |
| 2017/0206259 | A1* | 7/2017 | Yang ......................... G06F 21/62 |
| 2018/0176358 | A1* | 6/2018 | Jeganathan ............. H04W 4/80 |
| 2018/0181221 | A1* | 6/2018 | Nakajima ............. G06F 3/04883 |
| 2019/0121453 | A1* | 4/2019 | Dekel ...................... G06F 3/041 |
| 2020/0052520 | A1* | 2/2020 | Kang ...................... H02J 7/342 |
| 2020/0103988 | A1 | 4/2020 | Jeon et al. |
| 2022/0030403 | A1* | 1/2022 | Peng .................... H04W 80/02 |
| 2022/0147228 | A1* | 5/2022 | Yi ......................... G06F 3/04883 |
| 2022/0155878 | A1* | 5/2022 | Park .................... G06F 3/03545 |
| 2022/0206593 | A1* | 6/2022 | Park .................... H02J 50/12 |
| 2023/0004234 | A1* | 1/2023 | Jung .................... G06F 3/03545 |
| 2023/0179019 | A1* | 6/2023 | Wu ....................... G06F 1/1626 320/114 |
| 2023/0195244 | A1 | 6/2023 | Xi et al. |
| 2023/0352808 | A1* | 11/2023 | Chin-Chung ........... H02J 50/10 |

FOREIGN PATENT DOCUMENTS

| | | |
|---|---|---|
| CN | 106208172 A | 12/2016 |
| CN | 107624247 A | 1/2018 |
| CN | 207067941 U | 3/2018 |
| CN | 109871143 A | 6/2019 |
| CN | 110446194 A | 11/2019 |
| CN | 110636403 A | 12/2019 |
| CN | 110829616 A | 2/2020 |
| CN | 111225346 A | 6/2020 |
| CN | 111338490 A | 6/2020 |
| CN | 112230782 A | 1/2021 |
| CN | 113271576 A | 8/2021 |
| WO | 2016036672 A1 | 3/2016 |
| WO | 2020027412 A1 | 2/2020 |

\* cited by examiner

PAIRING METHOD AND PAIRING SYSTEM

CROSS-REFERENCE TO RELATED APPLICATIONS

This application is a national stage of International Application No. PCT/CN2022/072016, filed on Jan. 14, 2022, which claims priority to Chinese Patent Application No. 202110293428.X, filed on Mar. 15, 2021, and to Chinese Patent Application No. 202110357928.5, filed on Apr. 1, 2021. The disclosures of all the aforementioned applications are hereby incorporated by reference in their entireties.

TECHNICAL FIELD

Embodiments of this application relate to the field of communication technologies, and in particular, to a pairing method and a pairing system.

BACKGROUND

With the development of touch technologies, more and more electronic devices use a touch mode for human-computer interaction. A user may provide an input to an electronic device by touching a touchscreen of the electronic device by using a finger, or may provide an input to the electronic device by operating the touchscreen of the electronic device by using a stylus. The electronic device performs a corresponding operation based on the input of the user.

Currently, only after a stylus and an electronic device are paired and connected, the electronic device can detect an input of the stylus. The stylus and the electronic device may be paired and connected based on a Bluetooth manner. The stylus may broadcast a packet including a media access control (media access control, MAC) address of the stylus, and the electronic device may receive the packet by Bluetooth scanning. The electronic device parses the packet to obtain the MAC address of the stylus, and then displays a pairing dialog box, to remind the user to perform pairing and connection between the electronic device and the stylus.

However, if a plurality of Bluetooth-enabled electronic devices exist around the stylus, the plurality of electronic devices each can receive the packet broadcast by the stylus and can display a dialog box, causing disturbance to users.

SUMMARY

Embodiments of this application provide a pairing method and a pairing system, so that when an electronic device and a stylus are paired, other electronic devices around the stylus are prevented from displaying a pairing dialog box.

According to a first aspect, an embodiment of this application provides a pairing method, applied to a pairing system. The pairing system includes: a stylus, a wireless keyboard, and an electronic device. The stylus includes a first coil, and the wireless keyboard includes a second coil. The wireless keyboard charges the stylus through the second coil and the first coil. In response to that the wireless keyboard charges the stylus through the second coil and the first coil, the stylus sends a pairing request to the wireless keyboard through the first coil and the second coil. The wireless keyboard sends the pairing request to the electronic device. The electronic device displays a pairing dialog box based on the pairing request, where the pairing dialog box is used to prompt a user to trigger the electronic device and the stylus to perform pairing. The pairing request is used to instruct the electronic device to display the pairing dialog box, and the pairing request may include a media access control MAC address of the stylus. In an embodiment, the pairing request may further include a model of the stylus, factory information, and the like.

In this embodiment of this application, the stylus uses the wireless keyboard as an intermediate apparatus for pairing the electronic device with the stylus, and the wireless keyboard can directionally transmit the pairing request of the stylus to the electronic device, so that the electronic device displays the dialog box while other electronic devices around the stylus are prevented from displaying a dialog box, thereby improving user experience.

In a possible implementation, the stylus does not send a pairing request to the wireless key board through the first coil and the second coil every time the wireless keyboard charges the stylus through the second coil and the first coil. In response to that the wireless keyboard charges the stylus through the second coil and the first coil, the stylus may obtain a status of connection between the stylus and the electronic device. When the stylus is not connected to the electronic device, the stylus sends the pairing request to the wireless keyboard through the first coil and the second coil. When the stylus is connected to the electronic device, the stylus does not send the pairing request to the wireless keyboard.

In this embodiment of this application, the stylus may intelligently determine, based on a status of connection to the electronic device, whether to send the pairing request to the wireless keyboard, so as to improve intelligence of the stylus.

In this implementation, the stylus may detect by itself the status of connection to the electronic device. Alternatively, the electronic device may detect a status of connection to the stylus and further broadcast the connection status. Accordingly, the stylus may receive the connection status from the electronic device. For example, the electronic device may broadcast the connection status through a Bluetooth channel, and the stylus may perform scanning over Bluetooth, to obtain the connection status from the electronic device.

The wireless keyboard may charge the stylus through the second coil and the first coil. In a possible implementation, the wireless keyboard may charge the stylus based on a wireless protocol through the second coil and the first coil. For example, the wireless protocol may be a Qi protocol or a private protocol.

In such an embodiment, the stylus may send the pairing request to the wireless keyboard based on the wireless protocol. The pairing request is included in any data packet exchanged between the stylus and the wireless keyboard based on the wireless protocol. It should be understood that, in a possible implementation, the wireless keyboard may charge the stylus based on the Qi protocol, and the stylus may send the pairing request to the wireless keyboard based on the private protocol.

A manner in which the wireless keyboard sends the pairing request to the electronic device is described in the following two possible manners for implementation:

Manner 1: The wireless keyboard is in a connection for wireless communication to the electronic device, and the connection for wireless communication may be but is not limited to a Bluetooth connection, a Wi-Fi connection, or the like. In this manner, when the wireless keyboard receives the pairing request from the stylus, to enable the electronic device to parse the pairing request, the wireless keyboard may convert the pairing request sent based on the wireless protocol into a pairing request supporting a format for the wireless communication.

The wireless keyboard may parse the pairing request to obtain the MAC address of the stylus; and encapsulate the MAC address in a data packet in the format for the wireless communication; and the wireless keyboard sends the data packet in the format for the wireless communication to the electronic device.

In this manner, the electronic device receives the pairing request from the wireless keyboard based on the connection for wireless communication, and may display the pairing dialog box.

Manner 2: The wireless keyboard includes a third coil, the electronic device includes a fourth coil, and the electronic device charges the wireless keyboard through the fourth coil and the third coil, or the wireless keyboard charges the electronic device through the third coil and the fourth coil. In this manner, the wireless keyboard sends the pairing request to the electronic device through the third coil and the fourth coil.

The wireless keyboard sends the pairing request to the electronic device based on a wireless protocol. The wireless protocol may be the same as or different from the wireless protocol used by the stylus to send the pairing request. The pairing request is included in any data packet exchanged between the wireless keyboard and the electronic device based on the wireless protocol.

In this manner, the electronic device receives the pairing request from the wireless keyboard based on the fourth coil, and can detect whether the electronic device enables a wireless communication function, because the electronic device needs to be paired with and connected to the stylus based on the wireless communication function. The wireless communication function may be a Bluetooth function, a Wi-Fi function, or the like. If the electronic device does not enable the wireless communication function, the electronic device may output a prompt dialog box. The prompt dialog box is used to prompt the user to enable the wireless communication function of the electronic device. If the electronic device enables the wireless communication function, the electronic device may output the pairing dialog box.

According to a second aspect, an embodiment of this application provides a pairing method, applied to a stylus. The stylus includes a first coil, and a wireless keyboard includes a second coil. The method includes: In response to that the wireless keyboard charges the stylus through the second coil and the first coil, the stylus sends a pairing request to the wireless keyboard through the first coil and the second coil.

In a possible implementation, before the stylus sends the pairing request to the wireless key board through the first coil and the second coil, the method further includes: The stylus obtains a status of connection between the stylus and the electronic device.

The sending a pairing request to the wireless keyboard includes: In response to that the stylus is not connected to the electronic device, the stylus sends the pairing request to the wireless keyboard through the first coil and the second coil.

In a possible implementation, that the stylus obtains a status of connection between the stylus and the electronic device includes: The stylus detects the connection status.

In a possible implementation, that the stylus obtains a status of connection between the stylus and the electronic device includes: The stylus receives the connection status broadcast by the electronic device.

In a possible implementation, the sending a pairing request to the wireless keyboard includes: The stylus sends the pairing request to the wireless keyboard based on the wireless protocol.

In a possible implementation, the pairing request is included in any data packet exchanged between the stylus and the wireless keyboard based on the wireless protocol.

In a possible implementation, the pairing request includes a media access control MAC address of the stylus.

According to a third aspect, an embodiment of this application provides a pairing method, applied to a wireless keyboard. A stylus includes a first coil, and the wireless keyboard includes a second coil. The method includes:

the wireless keyboard receives a pairing request from the stylus through the second coil, and sends the pairing request to the electronic device.

In a possible implementation, that the wireless keyboard charges the stylus through the second coil and the first coil includes: The wireless keyboard charges the stylus based on a wireless protocol through the second coil and the first coil. That the wireless keyboard receives a pairing request from the stylus through the second coil includes: The wireless keyboard receives the pairing request from the stylus based on the wireless protocol through the second coil.

In a possible implementation, the pairing request is included in any data packet exchanged between the stylus and the wireless keyboard based on the wireless protocol.

In a possible implementation, the pairing request includes a media access control MAC address of the stylus.

In a possible implementation, the wireless keyboard is in a connection for wireless communication to the electronic device. Before the wireless keyboard sends the pairing request to the electronic device, the method further includes: The wireless keyboard parses the pairing request to obtain the MAC address of the stylus; and encapsulates the MAC address in a data packet in a format for the wireless communication. That the wireless keyboard sends the pairing request to the electronic device includes: The wireless keyboard sends the data packet in the format for the wireless communication to the electronic device.

In a possible implementation, the wireless keyboard includes a third coil, and the electronic device includes a fourth coil. The electronic device charges the wireless keyboard through the fourth coil and the third coil. That the wireless keyboard sends the pairing request to the electronic device includes: The wireless keyboard sends the pairing request to the electronic device through the third coil and the fourth coil.

In a possible implementation, the sending the pairing request to the electronic device includes: The wireless keyboard sends the pairing request to the electronic device based on a wireless protocol.

In a possible implementation, the pairing request is included in any data packet exchanged between the wireless keyboard and the electronic device based on the wireless protocol.

According to a fourth aspect, an embodiment of this application provides a pairing method, applied to an electronic device. The method includes:

the electronic device receives a pairing request from a wireless keyboard; and the electronic device displays a pairing dialog box based on the pairing request, where the pairing dialog box is used to prompt a user to trigger the electronic device and the stylus to perform pairing.

In a possible implementation, the electronic device detects the connection status and broadcasts the connection status.

In a possible implementation, the wireless keyboard is in a connection for wireless communication to the electronic device. That the electronic device receives a pairing request from a wireless keyboard includes: The electronic device receives a data packet in a format for the wireless communication, where the data packet includes the pairing request.

In a possible implementation, the wireless keyboard includes a third coil, and the electronic device includes a fourth coil. The electronic device charges the wireless keyboard through the fourth coil and the third coil. That the electronic device receives a pairing request from a wireless keyboard includes: The electronic device receives the pairing request from the wireless key board through the fourth coil.

In a possible implementation, the pairing request is sent by the wireless keyboard to the electronic device based on a wireless protocol.

In a possible implementation, the pairing request is included in any data packet exchanged between the wireless keyboard and the electronic device based on the wireless protocol.

In a possible implementation, the method further includes: In response to receiving the pairing request from the wireless keyboard, the electronic device detects whether the electronic device enables a wireless communication function; and if the electronic device does not enable the wireless communication function, the electronic device outputs a prompt dialog box, where the prompt dialog box is used to prompt the user to enable the wireless communication function of the electronic device.

In a possible implementation, the pairing request includes a media access control MAC address of the stylus.

According to a fifth aspect, an embodiment of this application provides a stylus, including a processor and a memory, where the memory stores computer executable instructions; and the processor executes the computer executable instructions stored in the memory, so that the processor executes the method according to the second aspect.

According to a sixth aspect, an embodiment of this application provides a wireless keyboard, including a processor and a memory, where the memory stores computer executable instructions; and the processor executes the computer executable instructions stored in the memory, so that the processor executes the method according to the third aspect.

According to a seventh aspect, an embodiment of this application provides an electronic device, including a processor and a memory, where the memory stores computer executable instructions; and the processor executes the computer executable instructions stored in the memory, so that the processor executes the method according to the fourth aspect.

According to an eighth aspect, an embodiment of this application provides a pairing system, where the pairing system includes the stylus according to the fifth aspect, the wireless keyboard according to the sixth aspect, and the electronic device according to the seventh aspect, and the system can execute the method according to the first aspect.

According to a ninth aspect, an embodiment of this application provides a computer program product including instructions, where when the computer program product is run on a computer, the computer is enabled to execute the methods according to the second to the fourth aspects.

According to a tenth aspect, an embodiment of this application provides a computer-readable storage medium, where the computer-readable storage medium stores instructions, and when the instructions are run on a computer, the computer is enabled to execute the methods according to the second to the fourth aspects.

For beneficial effects of the possible implementations of the second aspect to the tenth aspect, refer to the beneficial effects brought by the first aspect and the possible implementations of the first aspect. Details are not described herein again.

The embodiments of this application provide the pairing method and the pairing system. The pairing system includes the stylus, the wireless keyboard, and the electronic device. The stylus includes the first coil, and the wireless keyboard includes the second coil. The method includes: In response to that the wireless keyboard charges the stylus through the second coil and the first coil, the stylus sends the pairing request to the wireless keyboard through the first coil and the second coil. The wireless keyboard sends the pairing request to the electronic device. The electronic device displays the pairing dialog box based on the pairing request, where the pairing dialog box is used to prompt the user to trigger the electronic device and the stylus to perform pairing. In the embodiments of this application, the stylus uses the wireless keyboard as an intermediate apparatus for pairing the electronic device with the stylus, and the wireless keyboard can directionally transmit the pairing request from the stylus to the electronic device, so that the electronic device displays the dialog box while other electronic devices around the stylus are prevented from displaying a dialog box, thereby improving user experience.

DESCRIPTION OF EMBODIMENTS

Figure 1:
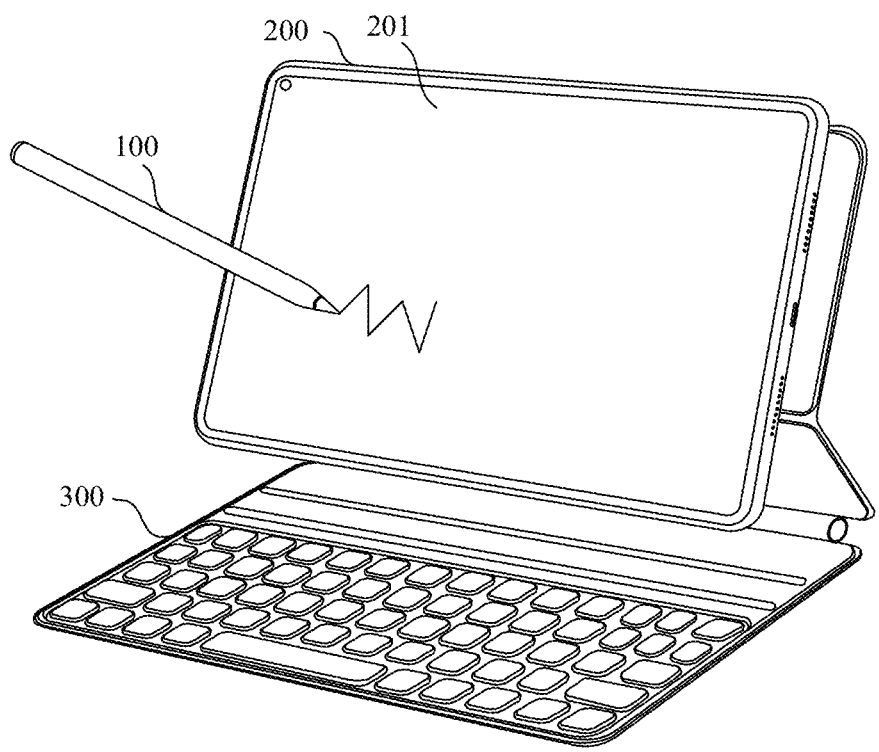
FIG. 1 is a schematic diagram of a scenario according to an embodiment of this application.

FIG. 1 is a schematic diagram of a scenario to which the embodiments of this application are applicable. Referring to FIG. 1, the scenario includes a stylus (stylus) 100, an electronic device 200, and a wireless keyboard 300. In FIG. 1, an example in which the electronic device 200 is a tablet (tablet) is used for description. The stylus 100 and the wireless keyboard 300 each may provide an input to the electronic device 200, and in response to the input, the electronic device 200 performs an operation based on the input of the stylus 100 or the wireless keyboard 300. A touch area may be disposed on the wireless keyboard 300. The stylus 100 may operate the touch area of the wireless keyboard 300 to provide an input to the wireless keyboard 300, and based on the input of the stylus 100, the wireless keyboard 300 may perform an operation in response to the input. In an embodiment, the stylus 100 and the electronic device 200, the stylus 100 and the wireless keyboard 300, and the electronic device 200 and the wireless keyboard 300 may be interconnected through a communication network, to implement interaction between wireless signals. The communication network may be, but is not limited to, a short-range communication network, such as a Wi-Fi hotspot network, a Wi-Fi peer-to-peer (peer-to-peer, P2P) network, a Bluetooth network, a ZigBee network, or a near field communication (near field communication. NFC) network.

The stylus 100 may be, but is not limited to, an inductive stylus and a capacitive stylus. The electronic device 200 has a touchscreen 201. When the stylus 100 is an inductive stylus, an electromagnetic induction board needs to be integrated on the touchscreen 201 of the electronic device 200 interacting with the stylus 100. A coil is distributed on the electromagnetic induction board, and a coil is also integrated in the inductive stylus. According to an electromagnetic induction principle, the inductive stylus can accumulate electric energy with movement of the inductive stylus in a magnetic field range generated by the electromagnetic induction board. The inductive stylus can transmit the accumulated electric energy to the electromagnetic induction board through the coil in the inductive stylus and free oscillation. The electromagnetic induction board may scan the coil on the electromagnetic induction board based on the electric energy from the inductive stylus, and calculate a location of the inductive stylus on the touchscreen 201. The touchscreen 201 of the electronic device 200 may also be referred to as a touch screen, and the stylus 201 may be referred to as a stylus.

The capacitive stylus may include a passive capacitive stylus and an active capacitive stylus. The passive capacitive stylus may be referred to as a passive capacitive stylus, and the active capacitive stylus may be referred to as an active capacitive stylus.

One or more electrodes may be disposed in the active capacitive stylus (for example, a stylus tip). The active capacitive stylus may transmit a signal through the electrode. When the stylus 100 is an active capacitive stylus, an electrode array needs to be integrated on the touchscreen 201 of the electronic device 200 interacting with the stylus 100. In an embodiment, the electrode array may be a capacitive electrode array. The electronic device 200 may receive a signal from the active capacitive stylus through the electrode array, and when receiving the signal, identify a location of the active capacitive stylus on the touchscreen and an inclination angle of the active capacitive stylus based on a change in a capacitance value on the touchscreen 201.

Figure 2A:
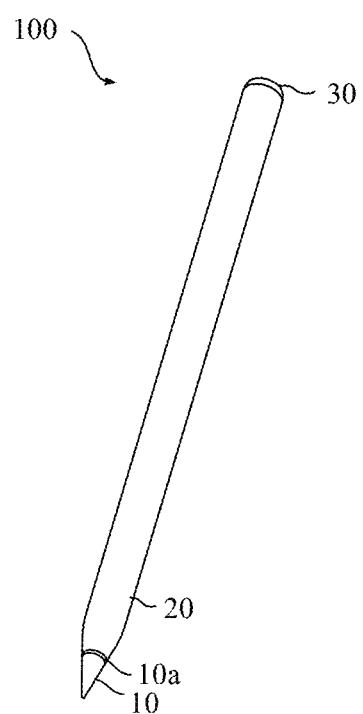
FIG. 2A is a schematic diagram of a structure of a stylus according to an embodiment of this application.

FIG. 2A is a schematic diagram of a structure of a stylus according to an embodiment of this application. Referring to FIG. 2A, the stylus 100 may include a stylus tip 10, a stylus rod 20, and a rear cover 30. The inside of the stylus rod 20 is in a hollow structure. The stylus tip 10 and the rear cover 30 are respectively located at two ends of the stylus rod 20. The rear cover 30 and the stylus rod 20 may be connected through plugging or snapping. For a fitting relationship between the stylus tip 10 and the stylus rod 20, refer to descriptions in FIG. 2B.

Figure 2B:
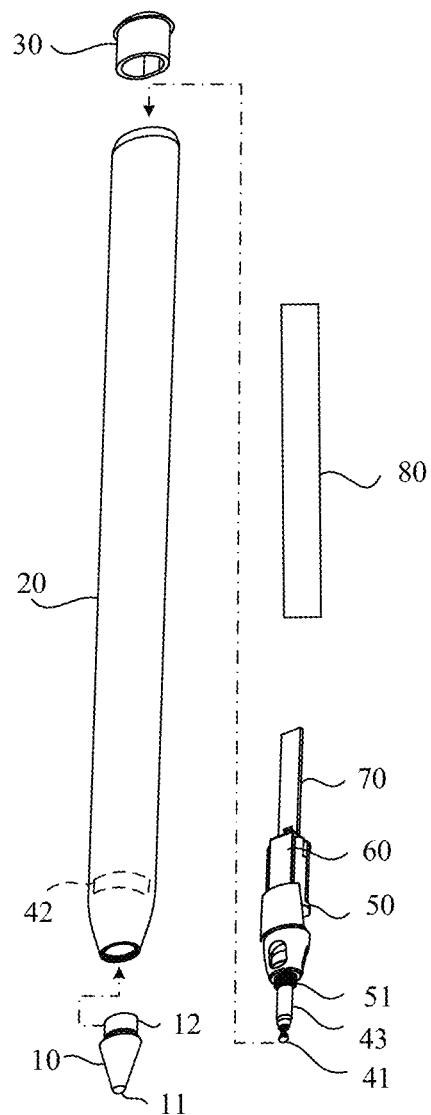
FIG. 2B is a schematic diagram of a partially split structure of a stylus according to an embodiment of this application.

FIG. 2B is a schematic diagram of a partially split structure of a stylus according to an embodiment of this application. Referring to FIG. 2B, the stylus 100 further includes a spindle component 50. The spindle component 50 is located in the stylus rod 20, and the spindle component 50 is slidably disposed in the stylus rod 20. The spindle component 50 has an external screw thread 51, and the stylus tip 10 includes a writing end 11 and a connecting end 12. The connecting end 12 of the stylus tip 10 has an internal screw thread (not shown) fitting the external screw thread 51.

When the spindle component 50 is assembled into the stylus rod 20, the connecting end 12 of the stylus tip 10 extends into the stylus rod 20 and is threadedly connected to the external screw thread 51 of the spindle component 50. In some other examples, the connecting end 12 of the stylus tip 10 may alternatively be connected to the spindle component 50 in a detachable manner such as snapping. The connecting end 12 of the stylus tip 10 is detachably connected to the spindle component 50, to implement replacement of the stylus tip 10.

To detect pressure applied to the writing end 11 of the stylus tip 10, as shown in FIG. 2A, there is a gap 10a between the stylus tip 10 and the stylus rod 20. In this way, it can be ensured that when the writing end 11 of the stylus tip 10 is subjected to an external force, the stylus tip 10 can move toward the stylus rod 20, and movement of the stylus tip 10 drives the spindle component 50 to move in the stylus rod 20. To detect the external force, as shown in FIG. 2B, a pressure sensing component 60 is disposed on the spindle component 50. A part of the pressure sensing component 60 is fixedly connected to a fastener in the stylus rod 20, and a part of the pressure sensing component 60 is fixedly connected to the spindle component 50. In this way, when the spindle component 50 moves with the stylus tip 10, because the part of the pressure sensing component 60 is fixedly connected to the fastener in the stylus rod 20, movement of the spindle component 50 drives deformation of the pressure sensing component 60, and the deformation of the pressure sensing component 60 is transmitted to a circuit board 70 (for example, the pressure sensing component 60 and the circuit board 70 can be electrically connected through a wire or a flexible circuit board). The circuit board 70 detects the pressure of the writing end 11 of the stylus tip 10 based on the deformation of the pressure sensing component 60, and therefore controls a line thickness of the writing end 11 based on the pressure of the writing end 11 of the stylus tip 10.

It should be noted that detection on the pressure of the stylus tip 10 includes but is not limited to the foregoing method. For example, a pressure sensor may be further disposed at the writing end 11 of the stylus tip 10, and the pressure of the stylus tip 10 is detected by the pressure sensor.

In this embodiment, as shown in FIG. 2B, the stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are electrically connected to the circuit board 70. The first transmitting electrode 41 may be located in the stylus tip 10 and close to the writing end 11. The circuit board 70 may be configured to provide a signal control board to each of the first transmitting electrode 41 and the second transmitting electrode 42, and the first transmitting electrode 41 is configured to transmit a first signal. When the first transmitting electrode 41 is close to the touchscreen 201 of the electronic device 200, a coupling capacitance may be formed between the first transmitting electrode 41 and the touchscreen 201 of the electronic device 200, so that the electronic device 200 can receive the first signal. The second transmitting electrode 42 is configured to transmit a second signal, and the electronic device 200 can determine an inclination angle of the stylus 100 based on the received second signal. In this embodiment of this application, the second transmitting electrode 42 may be located on an inner wall of the stylus rod 20. In an example, the second transmitting electrode 42 may alternatively be located on the spindle component 50.

The ground electrode 43 may be located between the first transmitting electrode 41 and the second transmitting electrode 42, or the ground electrode 43 may be located at an outer periphery of the first transmitting electrode 41 and the second transmitting electrode 42, and the ground electrode 43 is configured to reduce coupling between the first transmitting electrode 41 and the second transmitting electrode 42.

When the electronic device 200 receives a first signal from the stylus 100, a capacitance value at a corresponding location on the touchscreen 201 changes. Based on this, the electronic device 200 may determine a location of the stylus 100 (or the stylus tip of the stylus 100) on the touchscreen 201 based on the change in the capacitance value on the touchscreen 201. In addition, the electronic device 200 may obtain the inclination angle of the stylus 100 by using a double-tip projection method in an inclination angle detection algorithm. Because locations of the first transmitting electrode 41 and the second transmitting electrode 42 in the stylus 100 are different, when the electronic device 200 receives the first signal and a second signal from the stylus 100, capacitance values at the two locations on the touchscreen 201 change. The electronic device 200 may obtain the inclination angle of the stylus 100 based on a distance between the first transmitting electrode 41 and the second transmitting electrode 42 and a distance between the two locations at which the capacitance values on the touchscreen 201 change. For more detailed descriptions of obtaining the inclination angle of the stylus 100, refer to related descriptions of the double-tip projection method in the conventional technology.

In this embodiment of this application, as shown in FIG. 2B, the stylus 100 further includes a battery assembly 80, where the battery assembly 80 is configured to provide power to the circuit board 70. The battery assembly 80 may include a lithium-ion battery, or the battery assembly 80 may include a nickel-chromium battery, an alkaline battery, a nickel-metal hydride battery, or the like. In an embodiment, the battery included in the battery assembly 80 may be a rechargeable battery or a disposable battery. When the battery included in the battery assembly 80 may be the rechargeable battery, the stylus 100 can charge the battery in the battery assembly 80 through wireless charging.

Figure 3:
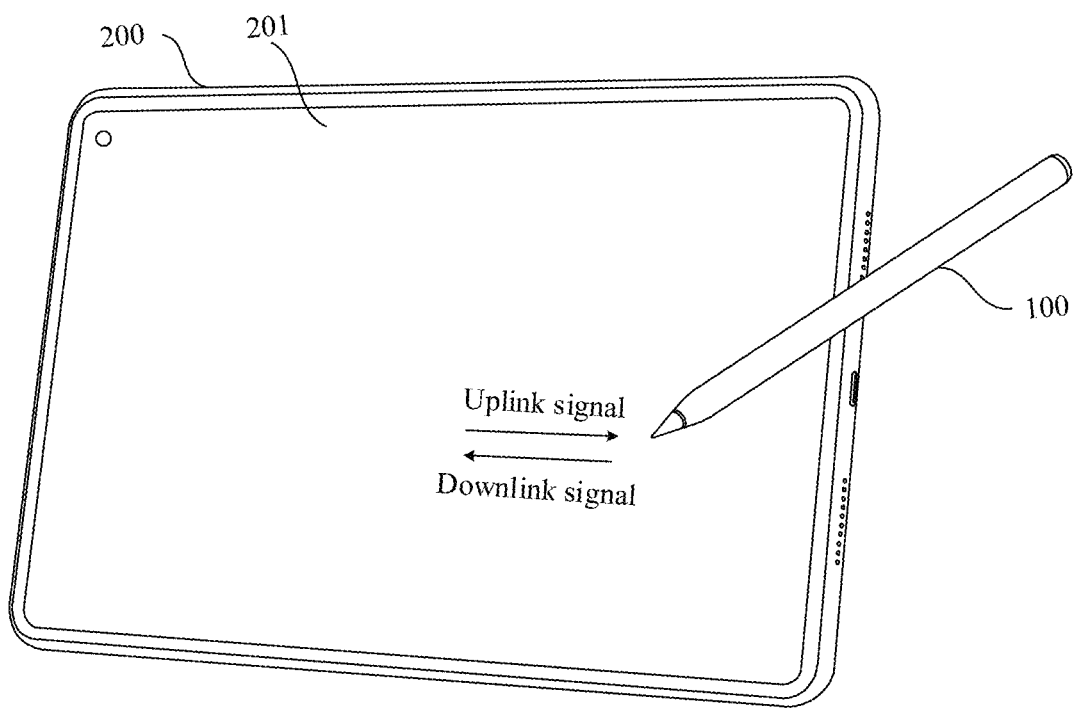
FIG. 3 is a schematic diagram of interaction between a stylus and an electronic device according to an embodiment of this application.

When the stylus 100 is an active capacitive stylus, as shown in FIG. 3, after the electronic device 200 is wirelessly connected to the stylus 100, the electronic device 200 may send an uplink signal to the stylus 100 through the electrode array integrated on the touchscreen 201. The stylus 100 may receive the uplink signal through a receiving electrode, and the stylus 100 transmits a downlink signal through a transmitting electrode (for example, the first transmitting electrode 41 and the second transmitting electrode 42). The downlink signal includes the first signal and the second signal. When the stylus tip 10 of the stylus 100 is in contact with the touchscreen 201, the capacitance value at the corresponding location on the touchscreen 201 changes, and the electronic device 200 may determine a location of the stylus tip 10 of the stylus 100 on the touchscreen 201 based on the capacitance value on the touchscreen 201. In an embodiment, the uplink signal and the downlink signal may be square wave signals.

Figure 4:
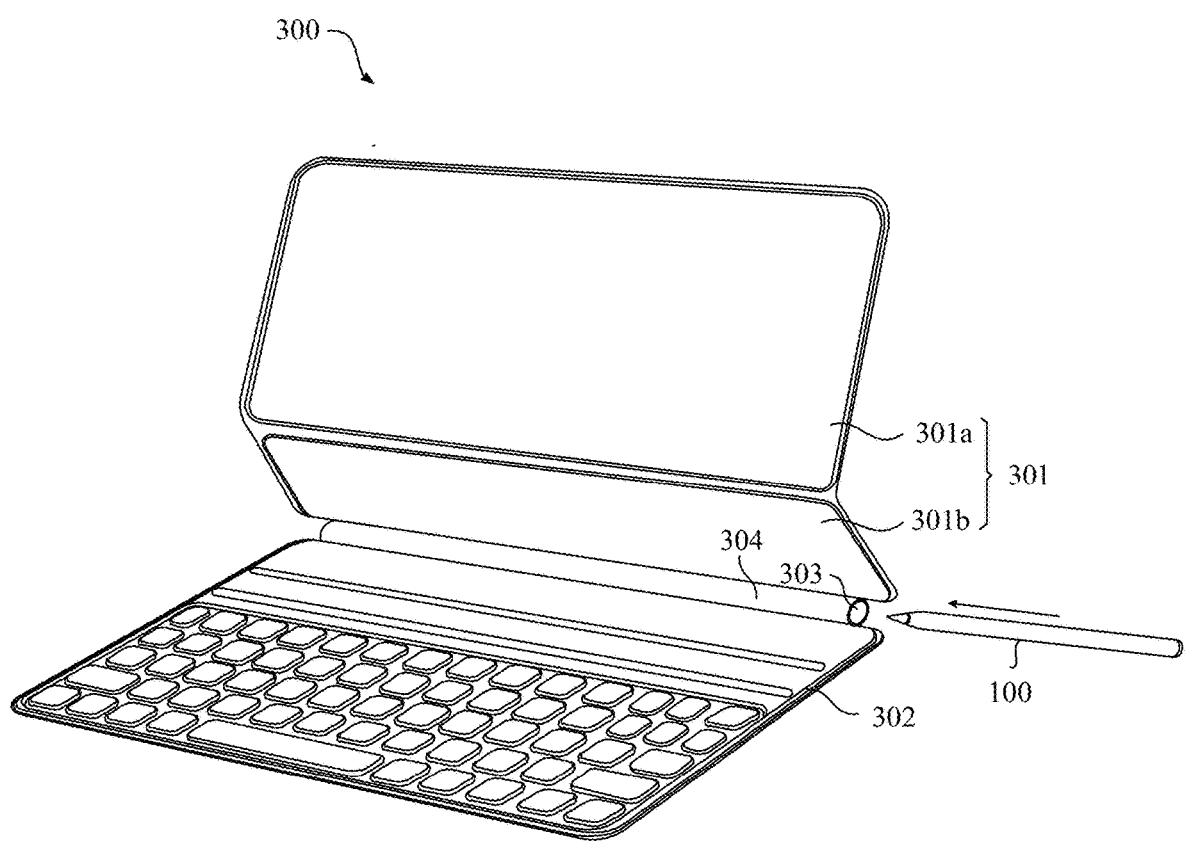
FIG. 4 is a schematic diagram of assembly of a stylus and a wireless keyboard according to an embodiment of this application.

In an embodiment, as shown in FIG. 4, the wireless keyboard 300 may include a first portion 301 and a second portion 302. For example, the wireless keyboard 300 may include a keyboard body and a keyboard cover. The first portion 301 may be the keyboard cover, and the second portion 302 is the keyboard body. The first portion 301 is configured to place the electronic device 200, and the second portion 302 may be provided with a button, a touchpad, or the like for a user operation.

When the wireless keyboard 300 is used, the first portion 301 and the second portion 302 of the wireless keyboard 300 need to be opened. When the wireless keyboard 300 is not used, the first portion 301 and the second portion 302 of the wireless keyboard 300 can be closed. In an embodiment, the first portion 301 and the second portion 302 of the wireless keyboard 300 are rotatably connected to each other. For example, the first portion 301 and the second portion 302 may be connected through a rotating shaft or a hinge. Alternatively, in some examples, the first portion 301 and the second portion 302 are rotatably connected by using a flexible material (for example, a leather material or a cloth material). Alternatively, in some examples, the first portion 301 and the second portion 302 may be integrally formed, and a connection part between the first portion 301 and the second portion 302 is thinned, so that the connection part between the first portion 301 and the second portion 302 can be bent. A manner of the connection between the first portion 301 and the second portion 302 may include but is not limited to the foregoing rotational connection manners.

The first portion 301 may include at least two rotatably connected supports. For example, as shown in FIG. 4, the first portion 301 includes a first support 301a and a second support 301b. The first support 301a and the second support 301b are rotatably connected to each other. During use, the first support 301a and the second support 301b may be used to jointly support the electronic device 200 (for details, refer to FIG. 1). Alternatively, the first support 301a supports the second support 301b, and the second support 301b supports the electronic device 200. Referring to FIG. 4, the second support 301b and the second portion 302 are rotatably connected to each other.

As shown in FIG. 4, to accommodate the stylus 100, the wireless keyboard 300 may be provided with an accommodating portion 303 for accommodating the stylus 100. As shown in FIG. 4, the accommodating portion 303 is a tubular cavity. During accommodation, the stylus 100 is inserted into the accommodating cavity along an arrow direction in FIG. 4. In this embodiment, as shown in FIG. 4, the second portion 302 and the second support 301b are rotatably connected to each other through a connecting portion 304, and the accommodating portion 303 is disposed in the connecting portion 304. The connecting portion 304 may be a rotating shaft.

Figure 5A:
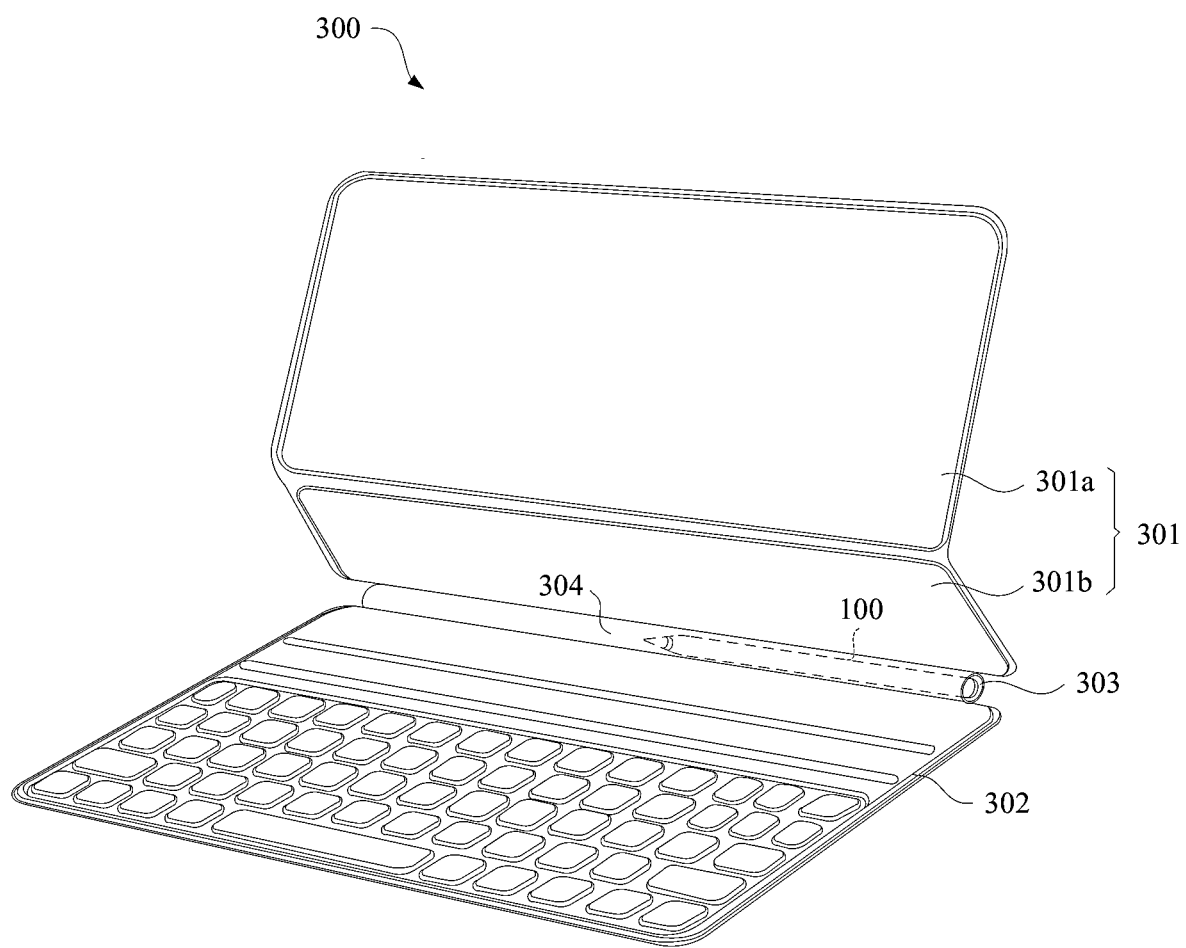
FIG. 5A is a schematic diagram in which a stylus is accommodated in an accommodating portion of a wireless keyboard according to an embodiment of this application.
Figure 5B:
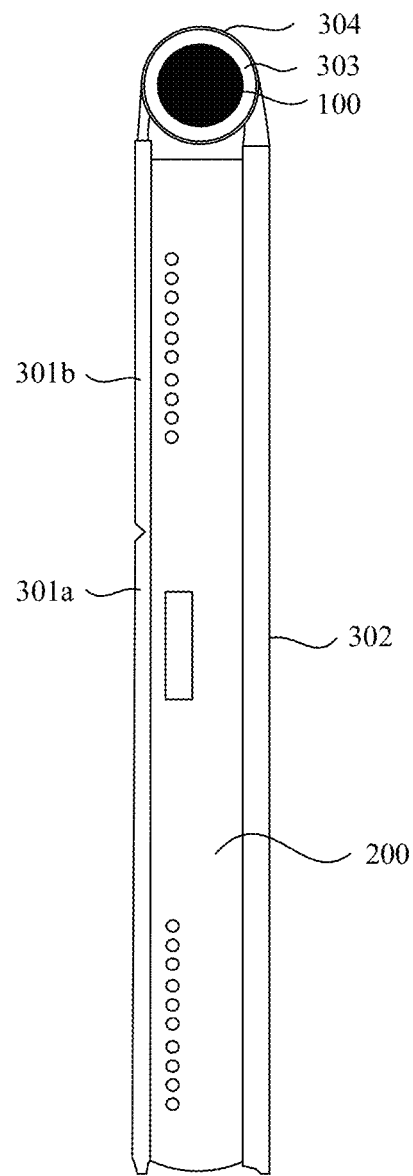
FIG. 5B is a schematic side view of an electronic device, a stylus, and a wireless key board according to an embodiment of this application.

FIG. 5A is a schematic diagram in which a stylus is accommodated in an accommodating portion of a wireless keyboard according to an embodiment of this application. FIG. 5B is a schematic side view obtained when a stylus is accommodated in an accommodating portion of a wireless keyboard according to an embodiment of this application. Referring to FIG. 5B, the accommodating portion 303 is a circular cavity, and an inner diameter of the accommodating portion 303 is greater than an outer diameter of the stylus 100.

In an embodiment, a magnetic material may be disposed on an inner wall of the accommodating portion 303, and a magnetic material may be disposed in the stylus 100, to prevent the stylus 100 from falling out of the accommodating portion 303. The stylus 100 is attached in the accommodating portion 303 through magnetic adsorption between the magnetic materials. Certainly, in some examples, when the stylus 100 is fastened to the accommodating portion 303, the stylus 100 is fastened to the accommodating portion 303 through magnetic adsorption or the like. For example, the stylus 100 may also be alternatively to the accommodating portion 303 through snapping.

To facilitate removal of the stylus 100 from the accommodating portion 303, an eject structure may be disposed in the accommodating portion 303. For example, one end of the stylus 100 is pressed, so that the eject mechanism can drive one end of the stylus 100 to eject from the accommodating portion 303.

Figure 6:
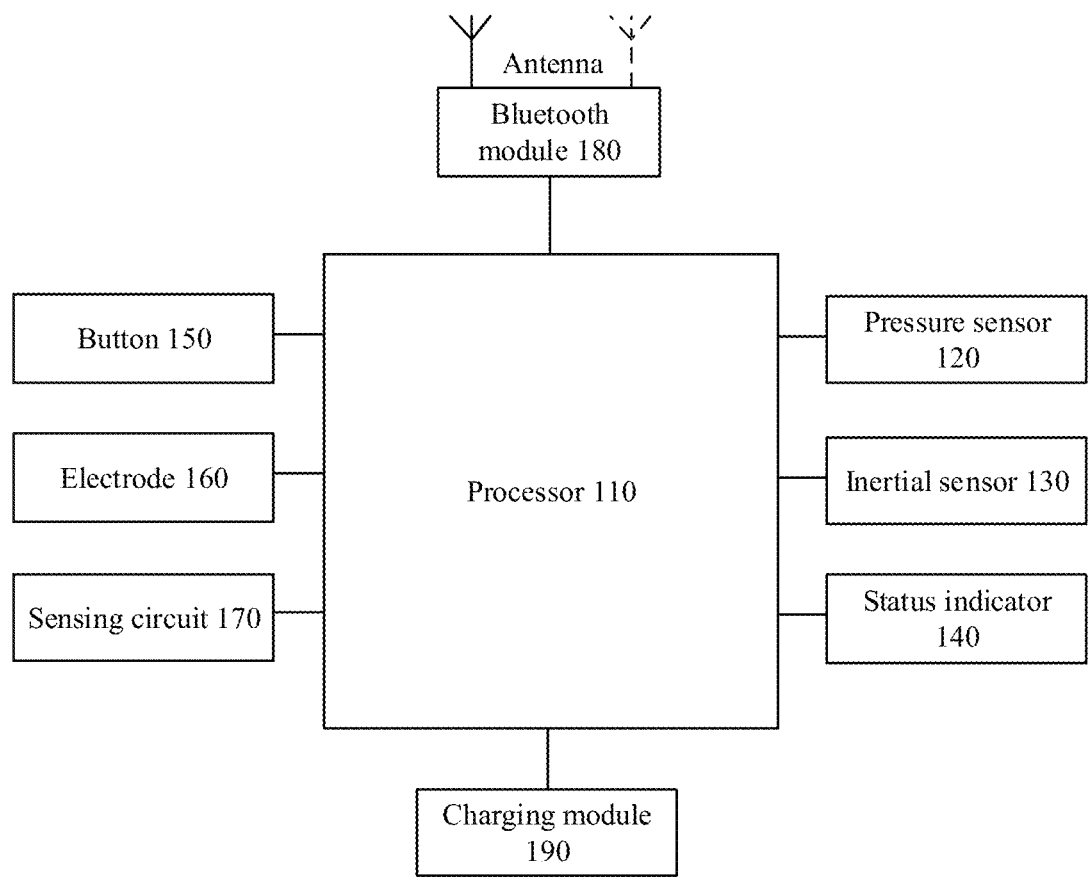
FIG. 6 is a schematic diagram of a hardware structure of a stylus according to an embodiment of this application.

FIG. 6 is a schematic diagram of a hardware structure of a stylus according to an embodiment of this application. Referring to FIG. 6, the stylus 100 may have a processor 110. The processor 110 may include storage and processing circuits configured to support operations of the stylus 100. The storage and processing circuits may include a storage apparatus (for example, a flash memory or another electrical programmable read-only memory configured as a solid-state drive) such as a non-volatile memory, a volatile memory (for example, a static or dynamic random access memory), and the like. The processing circuit in the processor 110 may be configured to control an operation of the stylus 100. The processing circuit may be based on one or more microprocessors, microcontrollers, digital signal processors, baseband processors, power management units, audio chips, application-specific integrated circuits, and the like.

The stylus 100 may include one or more sensors. For example, the sensor may include a pressure sensor 120. The pressure sensor 120 may be disposed at the writing end 11 of the stylus 100 (as shown in FIG. 2B). Certainly, the pressure sensor 120 may alternatively be disposed in the stylus rod 20 of the stylus 100. In this way, after one end of the stylus tip 10 of the stylus 100 is subject to a force, the other end of the stylus tip 10 moves to apply the force to the pressure sensor 120. In an embodiment, the processor 110 may adjust, based on pressure detected by the pressure sensor 120, a writing line thickness of the stylus tip 10 of the stylus 100.

The sensor may also include an inertial sensor 130. The inertial sensor 130 may include a three-axis accelerometer and a three-axis gyroscope, and/or another component configured to measure movement of the stylus 100. For example, a three-axis magnetometer may be included in the sensor in a configuration of a nine-axis inertial sensor. The sensor may also include an additional sensor, such as a temperature sensor, an ambient light sensor, an optical proximity sensor, a contact sensor, a magnetic sensor, a pressure sensor, and/or another sensor.

The stylus 100 may include a status indicator 140 such as a light-emitting diode and a button 150. The status indicator 140 is configured to prompt a user with a status of the stylus 100. The button 150 may include a mechanical button and a non-mechanical button, and the button 150 may be configured to collect button press information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the stylus tip 10. For details, refer to the foregoing related descriptions.

The stylus 100 may include a sensing circuit 170. The sensing circuit 170 may sense capacitive coupling between the electrode 160 and a drive line on a capacitive touch sensor panel interacting with the stylus 100. The sensing circuit 170 may include an amplifier used to receive capacitive readings from the capacitive touch sensor panel, a clock used to generate a demodulation signal, a phase shifter used to generate a phase-shifted demodulation signal, a mixer used to demodulate capacitive readings by using an in-phase demodulation frequency component, a mixer used to demodulate capacitive readings by using a quadrature demodulation frequency component, and the like. A demodulation result of the mixer may be used to determine an amplitude proportional to a capacitance, so that the stylus 100 can sense contact with the capacitive touch sensor panel.

It can be understood that the stylus 100 may include a microphone, a speaker, an audio generator, a vibrator, a camera, a data port, and another device based on an actual requirement. The user may use these devices to provide commands to control operations of the stylus 100 and the electronic device 200 interacting with the stylus 100, and receive status information and another output.

The processor 110 may be configured to run software that is on the stylus 100 and that controls an operation of the stylus 100. In an operation process of the stylus 100, the software running on the processor 110 may process a sensor input, a button input, and an input from another apparatus to monitor movement of the stylus 100 and an input of another user. The software running on the processor 110 may detect a user command and may communicate with the electronic device 200.

To support wireless communication between the stylus 100 and the electronic device 200, the stylus 100 may include a wireless module. In FIG. 6, an example in which the wireless module is a Bluetooth module 180 is used for description. The wireless module may alternatively be a Wi-Fi hotspot module, a Wi-Fi peer-to-peer module, or the like. The Bluetooth module 180) may include a radio frequency transceiver, for example, a transceiver. The Bluetooth module 180 may also include one or more antennas. The transceiver may transmit and/or receive a wireless signal through the antenna. The wireless signal may be a Bluetooth signal, a wireless local area network signal, a remote signal such as a cellular phone signal, a near field communication signal, or another wireless signal based on a type of the wireless module.

The stylus 100 may further include a charging module 190. The charging module 190 may support charging of the stylus 100 to provide power to the stylus 100.

It should be understood that the electronic device 200 in this embodiment of this application may be referred to as user equipment (user equipment, UE), a terminal (terminal), or the like. For example, the electronic device 200 may be a mobile terminal or a fixed terminal including a touchscreen, for example, a tablet (portable android device, PAD), a personal digital assistant (personal digital assistant. PDA), a handheld device having a wireless communication function, a computing device, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not specifically limited in the embodiments of this application.

Figure 7:
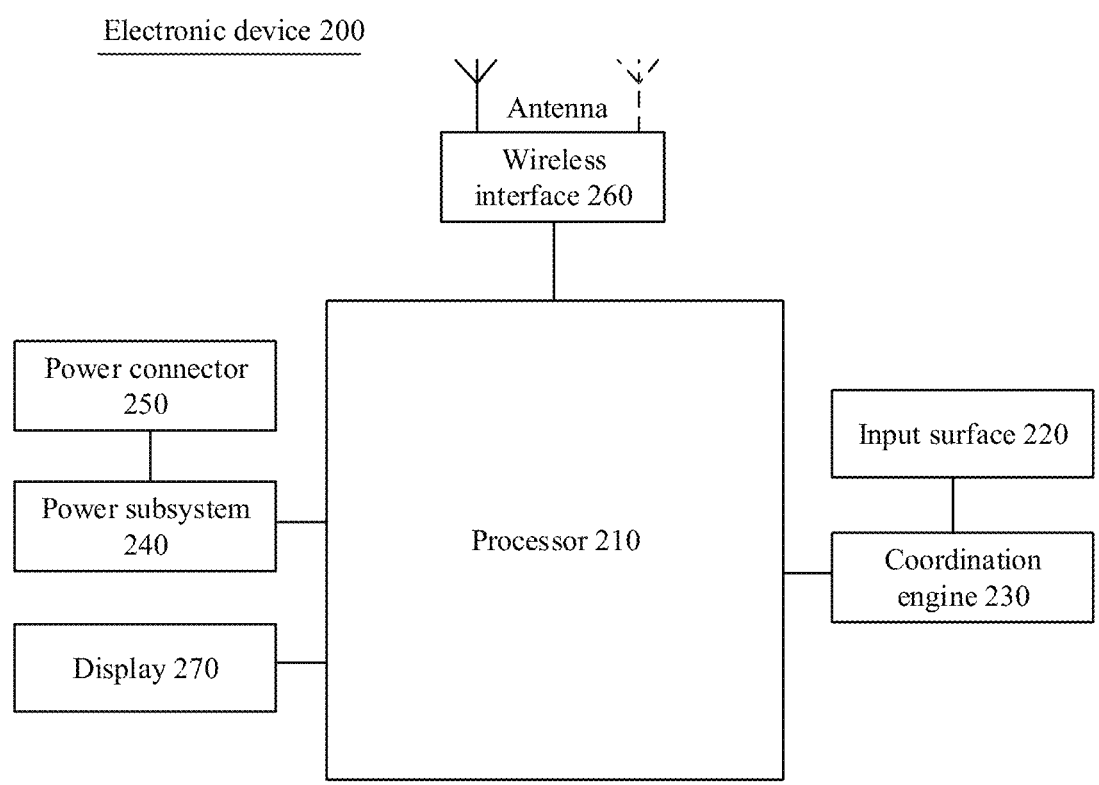
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. The subsystems cooperate to perform, coordinate, or monitor one or more operations or functions of the electronic device 202. The electronic device 200 includes a processor 210, an input surface 220, a coordination engine 230, a power subsystem 240, a power connector 250), a wireless interface 260, and a display 270.

For example, the coordination engine 230 may be configured to: communicate with another subsystem of the electronic device 200 and/or process data; communicate with and/or exchange data with the stylus 100; measure and/or obtain one or more outputs of one or more analog or digital sensors (for example, touch sensors); measure and/or obtain one or more outputs of one or more sensor nodes in a sensor node array (for example, a capacitive sensing node array); receive and position a tip signal and a ring signal from the stylus 100; position the stylus 100 based on locations of a tip signal crossing area and a ring signal crossing area, and the like.

The coordination engine 230 of the electronic device 200 includes or may be communicatively coupled, in another manner, to a sensor layer located below the input surface 220 or integrated with the input surface. The coordination engine 230 uses the sensor layer to position the stylus 100 on the input surface 220, and uses the technology described in this specification to estimate an angular location of the stylus 100 relative to a plane of the input surface 220. In an embodiment, the input surface 220 may be referred to as a touchscreen 201.

For example, the sensor layer of the coordination engine 230 of the electronic device 200 is a grid of capacitive sensing nodes arranged in columns and rows. More specifically, a column trace array is set to be perpendicular to a row trace array. The sensor layer may be separated from other layers of the electronic device, or the sensor layer may be disposed directly on another layer. The other layers are, for example but not limited to: a display stack layer, a force sensor layer, a digitizer layer, a polarizer layer, a battery layer, a structural or decorative shell layer, and the like.

The sensor layer can operate in various modes. If the sensor layer operates in mutual capacitance mode, a column trace and a row trace form a single capacitive sensing node (for example, a "vertical" mutual capacitance) at each overlapping point. If the sensor layer operates in self-capacitive mode, a column trace and a row trace form two (vertically aligned) capacitive sensing nodes at each overlapping point. In another implementation solution, if the sensor layer operates in mutual capacitance mode, adjacent column traces and/or adjacent row traces each may form a single capacitive sensing node (for example, a "horizontal" mutual capacitance). As described above, the sensor layer may monitor a change in a capacitance (for example, a mutual capacitance or a self-capacitance) presented at each capacitive sensing node to detect existence of the stylus tip 10 of the stylus 100 and/or touch of a finger of the user. In many cases, the coordination engine 230 may be configured to detect, through capacitive coupling, the tip signal and the ring signal received from the stylus 100 through the sensor layer.

The tip signal and/or the ring signal may include specific information and/or data that may be used to enable the electronic device 200 to identify the stylus 100. Such information is usually referred to as "stylus identity." information in this specification. The information and/or the data may be received by the sensor layer, and interpreted, decoded, and/or demodulated by the coordination engine 230.

The processor 210 may use the stylus identity information to receive an input from more than one stylus simultaneously. Specifically, the coordination engine 230 may be configured to transmit, to the processor 210, a location and/or an angular location that are/is of each of several styluses and that are/is detected by the coordination engine 230. In another case, the coordination engine 230) may further transmit, to the processor 210, information about relative locations and/or relative angular locations that are of a plurality of styluses and that are detected by the coordination engine 230). For example, the coordination engine 220 may notify the processor 210 of a location of the detected first stylus relative to the detected second stylus.

In another case, the tip signal and/or the ring signal may further include specific information and/or data used to enable the electronic device 200 to identify a specific user. Such information is usually referred to as "user identity" information in this specification.

The coordination engine 230 may forward the user identity information (if the user identity information can be detected and/or can be restored) to the processor 210. If the user identity information cannot be restored from the tip signal and/or the ring signal, the coordination engine 230) may optionally indicate to the processor 210 that the user identity information is unavailable. The processor 210 can utilize the user identity information (or absence of such information) in any suitable manner, including but not limited to: accepting or denying an input from the specific user, allowing or denying access to a specific function of the electronic device, and the like. The processor 210 may use the user identity information to simultaneously receive an input from more than one user.

In another case, the tip signal and/or the ring signal may include specific information and/or data that may be used to enable the electronic device 200 to identify settings or preferences of the user or the stylus 100. Such information is usually referred to as "stylus settings" information in this specification.

The coordination engine 230 may forward the stylus settings information (if the stylus settings information can be detected and/or can be restored) to the processor 210. If the stylus settings information cannot be restored from the tip signal and/or the ring signal, the coordination engine 230 may optionally indicate to the processor 210 that the stylus settings information is unavailable. The electronic device 200 can utilize the stylus settings information (or absence of such information) in any suitable manner, including but not limited to: applying settings to the electronic device, applying settings to a program running on the electronic device, changing a line thickness, a color, a pattern presented by a graphics program of the electronic device, changing settings of a video game operated on the electronic device, and the like.

In general, the processor 210 may be configured to perform, coordinate, and/or manage functions of the electronic device 200. Such functions may include, but are not limited to, communicating with and/or exchanging data with other subsystems of the electronic device 200; communicating with and/or exchanging data with the stylus 100; performing data communication and/or data exchange over a wireless interface; performing data communication and/or data exchange over a wired interface; facilitating exchange of power through a wireless (for example, inductive or resonant) or wired interface; receiving a location and an angular location of one or more styluses; and so on.

The processor 210 may be implemented as any electronic device capable of processing, receiving, or sending data or instructions. For example, the processor may be a microprocessor, a central processing unit, an application-specific integrated circuit, a field programmable gate array, a digital signal processor, an analog circuit, a digital circuit, or a combination of these devices. The processor may be a single-threaded processor or a multi-threaded processor. The processor may be a single-core processor or a multi-core processor.

During use, the processor 210 may be configured to access a memory that stores instructions. The instructions may be configured to enable the processor to perform, coordinate, or monitor one or more operations or functions of the electronic device 200.

The instructions stored in the memory may be configured to control or coordinate operations of other components of the electronic device 200. The components are, for example but not limited to, another processor, an analog or digital circuit, a volatile or nonvolatile memory module, a display, a speaker, a microphone, a rotary input device, a button, or other physical input devices, a biometric authentication sensor and/or system, a force or touch input/output component, a communication module (for example, a wireless interface and/or a power connector), and/or a haptic device or a haptic feedback device.

The memory may further store electronic data usable by the stylus or the processor. For example, the memory may store electronic data or content (such as a media file, a document, and an application), device settings and preferences, a timing signal and a control signal, data, data structures, or databases used for various modules, a file or a configuration related to detection of a tip signal and/or a ring signal, and the like. The memory may be configured as any type of memory. For example, the memory may be implemented as a random access memory, a read-only memory, a flash memory, a removable memory, another type of storage element, or a combination of these devices.

The electronic device 200 further includes the power subsystem 240. The power subsystem 240 may include a battery or another power supply. The power subsystem 240 may be configured to provide power to the electronic device 200. The power subsystem 240 may be further coupled to the power connector 250. The power connector 250 may be any proper connector or port, and may be configured to receive power from an external power supply and/or configured to provide power to an external load. For example, in some implementation solutions, the power connector 250 may be configured to recharge a battery in the power subsystem 240. In another implementation solution, the power connector 250 may be configured to transmit power stored in (or available to) the power subsystem 240 to the stylus 100.

The electronic device 200 further includes the wireless interface 260 to facilitate electronic communication between the electronic device 200 and the stylus 100. In an implementation solution, the electronic device 200 may be configured to communicate with the stylus 100 through a low energy Bluetooth communication interface or a near field communication interface. In another example, the communication interface facilitates electronic communication between the electronic device 200 and an external communication network, a device, or a platform.

The wireless interface 260 (whether a communication interface between the electronic device 200 and the stylus 100 or another communication interface) may be implemented as one or more wireless interfaces, a Bluetooth interface, a near field communication interface, a magnetic interface, a universal serial bus interface, an inductance interface, a resonant interface, a capacitive coupling interface, a Wi-Fi interface, a TCP/IP interface, a network communication interface, an optical interface, an acoustic interface, or any conventional communication interface.

The electronic device 200 further includes the display 270. The display 270 may be located behind the input surface 220, or may be integrated with the input surface 220. The display 270) may be communicatively coupled to the processor 210. The processor 210 may present information to a user through the display 270. In many cases, the processor 210 presents, through the display 270, a graphical user interface with which a user can interact. In many cases, the user manipulates the stylus 100 to interact with a graphical user interface.

It is appreciated by a person skilled in the art that some of the foregoing specific details presented by the electronic device 200 may not be required to practice the particular described implementation solutions or equivalents thereof. Similarly, another electronic device may include more subsystems, modules, components, and the like. In a proper case, some submodules may be implemented as software or hardware. Therefore, it should be understood that the foregoing descriptions are not intended to be exhaustive or to limit the disclosure to the exact form described in this specification. On the contrary, it is appreciated by a person of ordinary skill in the art that many modifications and variations are possible based on the foregoing teachings.

Figure 8:
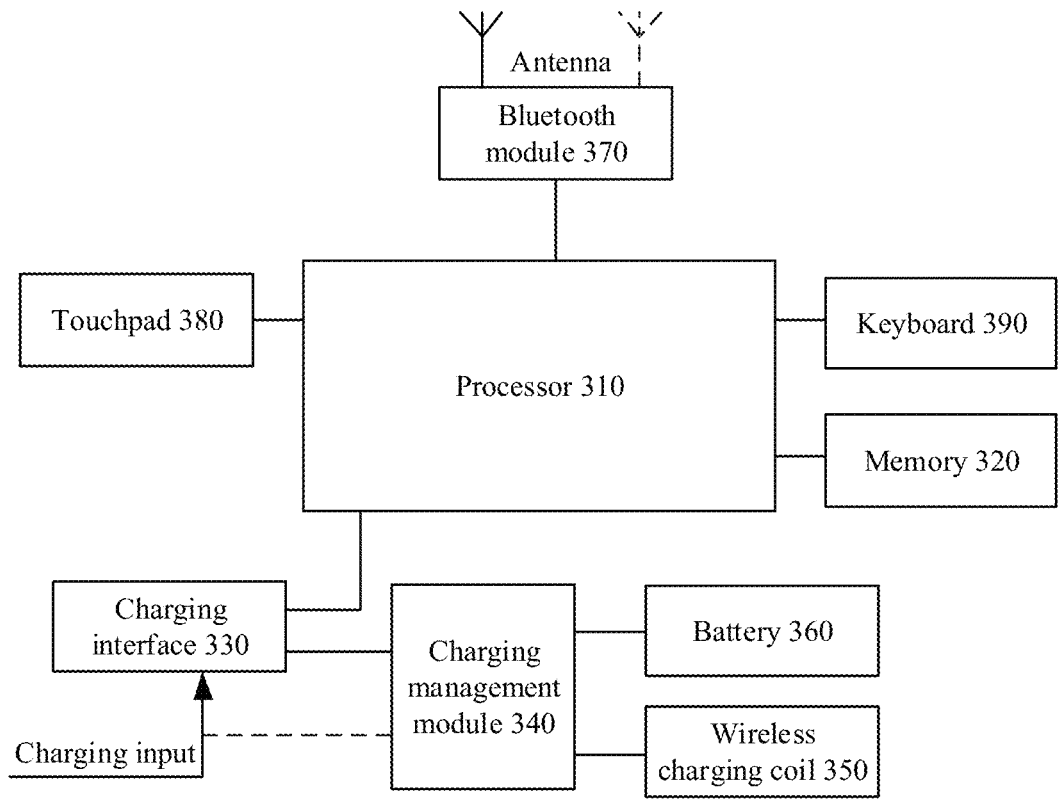
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340), a wireless charging coil 350, a battery 360, a wireless communication module 370, a touchpad 380, and a keyboard 390.

The processor 310, the memory 320, the charging interface 330, the charging management module 340, the battery 360, the wireless communication module 370, the touchpad 380, the keyboard 390, and the like may all be disposed on a keyboard body (that is, the second portion 302 shown in FIG. 4) of the wireless keyboard 300. The wireless charging coil 350 may be disposed in the connecting portion 304 (shown in FIG. 4) for movably connecting the keyboard body and a support. It can be understood that the structure shown in this embodiment does not constitute a specific limitation on the wireless keyboard 300. In some other embodiments, the wireless keyboard 300 may include more or fewer components than those shown in the figure, or combine some components, or split some components, or have different component arrangements. The components shown in the figure may be implemented in hardware, software, or a combination of software and hardware.

The memory 320 may be configured to store program code, for example, program code used to wirelessly charge the stylus 100. The memory 320 may further store a Bluetooth address for uniquely identifying the wireless keyboard 300. In addition, the memory 320 may further store connection data of an electronic device successfully paired with the wireless keyboard 300. For example, the connection data may be a Bluetooth address of the electronic device successfully paired with the wireless keyboard 300. Based on the connection data, the wireless keyboard 300 can be automatically paired with the electronic device without configuring a connection between the wireless keyboard 300 and the electronic device, for example, performing validity verification. The Bluetooth address may be a media access control (media access control, MAC) address.

The processor 310 may be configured to execute the foregoing application program code, and invoke related modules to implement functions of the wireless keyboard 300 in the embodiments of this application, for example, implement a wired charging function, a reverse wireless charging function, a wireless communication function, and the like of the wireless keyboard 300. The processor 310 may include one or more processing units, and different processing units may be separate devices or may be integrated into one or more processors 310. The processor 310 may be specifically an integrated control chip, or may include a circuit including various active and/or passive components, and the circuit is configured to perform functions of the processor 310 described in this embodiment of this application. The processor of the wireless keyboard 300 may be a microprocessor.

The wireless communication module 370 may be configured to support data exchange in wireless communication that is between the wireless keyboard 300 and another electronic device and that includes Bluetooth (bluetooth, BT), a global navigation satellite system (global navigation satellite system, GNSS), a wireless local area network (wireless local area networks, WLAN) (for example, a wireless fidelity (wireless fidelity. Wi-Fi) network), frequency modulation (frequency modulation, FM), a near field communication (near field communication, NFC) technology, an infrared (infrared, IR) technology, and the like.

In some embodiments, the wireless communication module 370 may be a Bluetooth chip. The wireless keyboard 300 may be a Bluetooth keyboard. The wireless keyboard 300 may be paired with a Bluetooth chip of another electronic device through the Bluetooth chip and establish a wireless connection, to implement wireless communication between the wireless keyboard 300 and the another electronic device through the wireless connection.

In addition, the wireless communication module 370 may further include an antenna. The wireless communication module 370 receives an electromagnetic wave through the antenna, performs frequency modulation and filtering processing on an electromagnetic wave signal, and sends a processed signal to the processor 310. The wireless communication module 370 may further receive a to-be-sent signal from the processor 310, perform frequency modulation and amplification on the signal, and convert the signal into an electromagnetic wave for radiation through the antenna.

In some embodiments, the wireless keyboard 300 may support wired charging. Specifically, the charging management module 340 may receive a charging input of a wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to the wireless charging coil of the wireless charger to induce an alternating electromagnetic field emitted by the wireless charging coil 350 of the wireless charger and generate an alternating electrical signal. The alternating current signal generated by the wireless charging coil 350 is transmitted to the charging management module 340 through the matching circuit, so as to charge the battery 330 wirelessly.

The charging management module 340 may further supply power to the wireless keyboard 300 while charging the battery 330. The charging management module 340 receives an input of the battery 330, and supplies power to the processor 310, the memory 320, an external memory, the wireless communication module 370, and the like. The charging management module 340 may be further configured to monitor parameters such as a battery capacity, a battery cycle count, and a battery health status (such as leakage or impedance) of the battery 360. In some other embodiments, the charging management module 340 may alternatively be disposed in the processor 310.

In some other embodiments, the wireless keyboard 300 may support reverse wireless charging. Specifically, the charging management module 340 may further receive an input of the charging interface 330 or the battery 360, and convert a direct electric signal that is input by the charging interface 330 or the battery 360 into an alternating electric signal. The alternating electric signal is transmitted to the wireless charging coil 350 through a matching circuit. The wireless charging coil 350 may generate an alternating electromagnetic field when receiving the alternating electric signal. A wireless charging coil of another mobile terminal induces the alternating electromagnetic field to perform wireless charging. To be specific, the wireless keyboard 300 may also wirelessly charge the another mobile terminal. In an embodiment, the wireless charging coil 350 may be disposed in the accommodating portion 303 of the wireless keyboard 300, and a wireless charging coil is disposed in the stylus rod 20 of the stylus 100. When the stylus 100 is placed in the accommodating portion 303, the wireless keyboard 300 may charge the stylus 100 through the wireless charging coil 350.

It should be noted that the matching circuit may be integrated into the charging management module 340, and the matching circuit may be independent of the charging management module 340. This is not limited in this embodiment of this application. FIG. 8 is a schematic diagram of a hardware structure of the wireless keyboard 300 by using an example in which the matching circuit may be integrated into the charging management module 340.

The charging interface 350) may be configured to provide a wired connection for charging or communication between the wireless keyboard 300 and another electronic device (for example, the wired charger of the wireless keyboard 300).

A touch sensor is integrated into the touchpad 380. A notebook computer may receive a user control command on the notebook computer through the touchpad 380 and the keyboard 390.

It can be understood that the structure shown in this embodiment of this application does not constitute a specific limitation on the wireless keyboard 300. The wireless keyboard 300 may have more or fewer components than those shown in FIG. 8, may combine two or more components, or may have different component configurations. For example, a housing of the wireless keyboard 300 may alternatively be provided with an accommodating portion for accommodating the stylus 100. The wireless charging coil 350 is disposed in the accommodating portion, and is configured to wirelessly charge the stylus 100 when the stylus 100 is accommodated in the accommodating portion.

For another example, the outer surface of the wireless keyboard 300 may further include components such as a button, an indicator (which may indicate a state such as a battery level, an incoming/outgoing call, and a pairing mode), and a display screen (which may prompt a user with related information). The button may be a physical button, a touch key (used in collaboration with the touch sensor), or the like, and is used to trigger an operation such as power-on, power-off, starting charging, or stopping charging.

Referring to the related descriptions in FIG. 3, after the stylus is wirelessly connected to the electronic device, the stylus may send a downlink signal to the electronic device. Based on the downlink signal, the electronic device may determine a location and an inclination angle of the stylus, and further display handwriting on the touchscreen based on the location and the inclination angle of the stylus. When the stylus is not wirelessly connected to the electronic device, the stylus cannot interact with the electronic device. A precondition for wireless connection between the stylus and the electronic device is pairing. Therefore, the stylus needs to be paired with and connected to the electronic device before providing an input to the electronic device.

A process of pairing between the electronic device and the stylus is a mutual authentication process between the two devices. After the electronic device is paired with the stylus, the electronic device and the stylus may not have to be paired each time for a subsequent connection. For the pairing between the electronic device and the stylus, mutual authentication may be performed through personal identification number (personal identification number. PIN) authentication. After the electronic device is paired with the stylus, the electronic device may establish a connection based on a media access control (MAC) address of the stylus. It should be understood that the process of pairing and connection between the electronic device and the stylus is briefly described herein. For details, refer to related descriptions in a standard protocol for Bluetooth pairing and connection.

In an embodiment, the electronic device and the stylus each have a Bluetooth function. When the electronic device is paired with the stylus, the user can perform an operation on the electronic device to enable Bluetooth on the electronic device, so as to scan a Bluetooth-enabled device around. The electronic device may display, on a graphical user interface, an identifier of a stylus detected by scanning, and the user taps, on the graphical user interface, on an identifier of a stylus that needs to be paired, to further implement pairing between the electronic device and the stylus. After the pairing between the electronic device and the stylus is completed, a Bluetooth connection may be established between the electronic device and the stylus.

Figure 9:
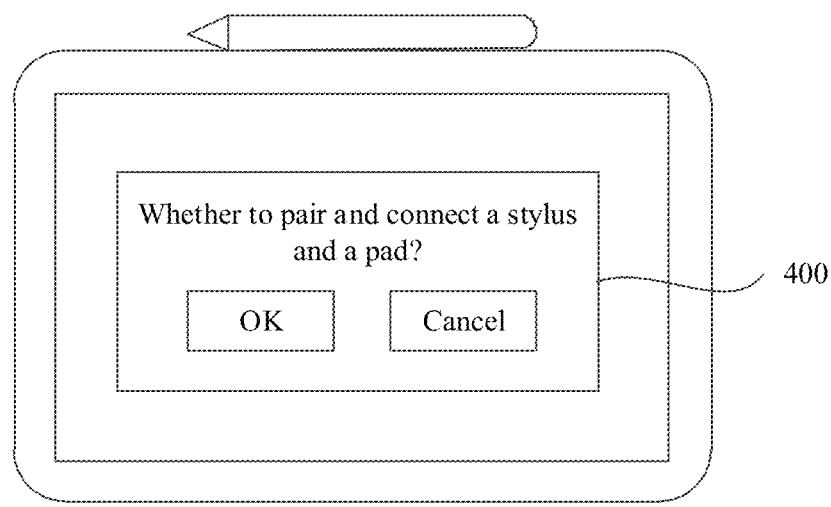
FIG. 9 is a schematic diagram of a current type of pairing between a stylus and an electronic device.

A process of triggering the pairing between the electronic device and the stylus by the user is complex. At present, the stylus may broadcast a packet. Based on the packet, the electronic device can actively discover the stylus, and can be paired with and connected to the stylus when discovering the stylus. Referring to FIG. 9, the stylus may be attached to the electronic device. When the stylus is attached to the electronic device, if the electronic device has enabled the Bluetooth function, the electronic device may display a pairing dialog box 400. A process of displaying the pairing dialog box by the electronic device may be: When the stylus is attached to the electronic device, the stylus broadcasts a packet through a Bluetooth common channel, where the packet includes the MAC address of the stylus. The electronic device may scan, through Bluetooth low energy (bluetooth low energy, BLE), the packet broadcast by the stylus, and then parse the packet to obtain the MAC address of the stylus. Based on the MAC address of the stylus, the electronic device displays the pairing dialog box to remind the user to trigger the stylus and the electronic device to perform pairing. The user may operate the dialog box to trigger the electronic device to perform pairing with and connection to the stylus based on the MAC address of the stylus. In this example, pairing and connection are performed synchronously on the stylus and the electronic device. Specifically, with reference to related descriptions of a conventional technology, a precondition for the pairing and connection between the stylus and the electronic device is that the electronic device obtains the MAC address of the stylus and displays the pairing dialog box.

As described above, when the stylus is paired with the electronic device, the MAC address of the stylus is broadcast over Bluetooth. If a plurality of Bluetooth-enabled electronic devices exist around the stylus, the plurality of electronic devices each may display a pairing dialog box, causing inconvenience to users.

In the scenario shown in FIG. 1, the electronic device, the wireless keyboard, and the stylus all have the Bluetooth function. In an embodiment, with reference to the related descriptions of FIG. 9, the stylus may be paired with and connected to the electronic device by using a broadcast packet. However, this may still lead to a dialog box on other Bluetooth-enabled electronic devices around the stylus.

This embodiment of this application provides the pairing method for a stylus and an electronic device. In the scenario shown in FIG. 1, the stylus uses the wireless keyboard as an intermediate apparatus for transmitting the MAC address of the stylus, to transmit the MAC address of the stylus to the electronic device, thereby enabling the electronic device to display the pairing dialog box. Because the stylus can directionally transmit the MAC address of the stylus to the electronic device by using the wireless keyboard, other Bluetooth-enabled electronic devices around the stylus each can be prevented from displaying a dialog box, thereby improving user experience.

It should be understood that, the pairing method for a stylus and an electronic device provided in this application may be applied to the first pairing process or a re-pairing process of the electronic device and the stylus. After the electronic device is paired with the stylus, the electronic device and the stylus always maintain a paired state, and the electronic device and the stylus may not have to be paired each time for a subsequent connection. In an embodiment, if the user restarts the electronic device or enables a flight mode of the electronic device, or the stylus is paired with another electronic device, or the electronic device and the stylus are disconnected for a long time, or the like, and the stylus needs to be reconnected to the electronic device, the electronic device and the stylus need to be paired again.

Before describing the pairing method for a stylus and an electronic device provided in this embodiment of this application, structures of the stylus the wireless keyboard, and the electronic device in this embodiment of this application are further described.

Figure 10A:
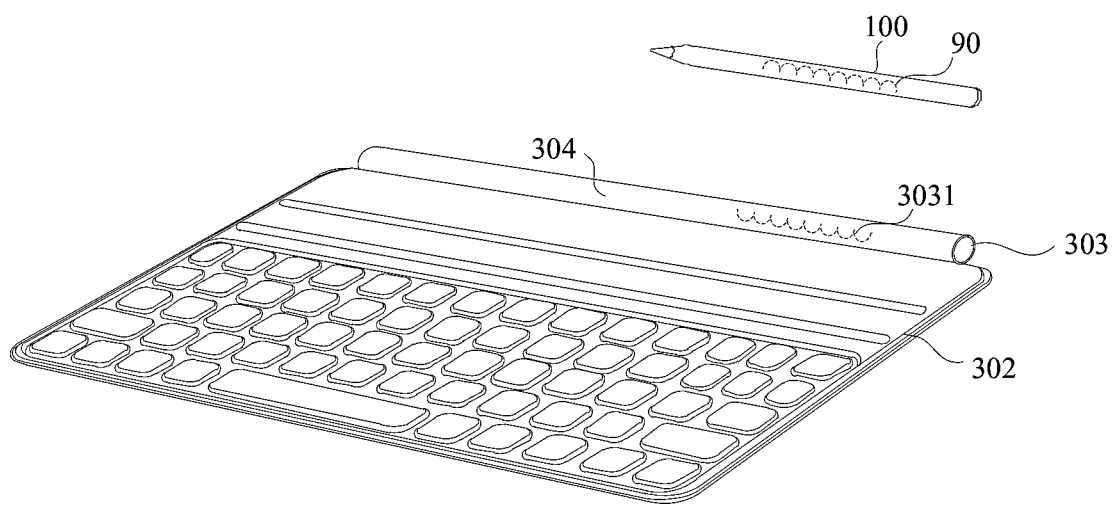
FIG. 10A is a schematic diagram of a structure of a stylus and a wireless keyboard according to an embodiment of this application.

In an embodiment, referring to FIG. 10A, the stylus rod 20 of the stylus 100 is provided with a first coil 90, and the connecting portion 304 of the wireless keyboard 300 is provided with a second coil 3031. In an embodiment, the second coil 3031 is located in a space between the connecting portion 304 and the accommodating portion 303, or the second coil 3031 is located in the accommodating portion 303. A location of the second coil 3031 is not limited in this embodiment. When the stylus 100 is accommodated in the accommodating portion 303, the wireless keyboard 300 may transmit electric energy to the stylus 100 through the second coil 3031, and the stylus 100 receives the electric energy from the second coil 3031 through the first coil 90, thereby enabling the wireless keyboard 300 to charge the stylus 100. For the charging of the stylus 100 by the wireless keyboard 300, refer to related descriptions in the Qi protocol.

The first coil 90 may be understood as being included in the charging module 190 shown in FIG. 6. In an embodiment, the first coil 90 may be connected to the processor 110. The second coil 3031 is included in the wireless charging coil 350 shown in FIG. 8. In an embodiment, the second coil 3031 may be connected to the processor 310. It should be understood that, other portions of the wireless keyboard 300 are not shown in FIG. 10A.

Figure 10B:
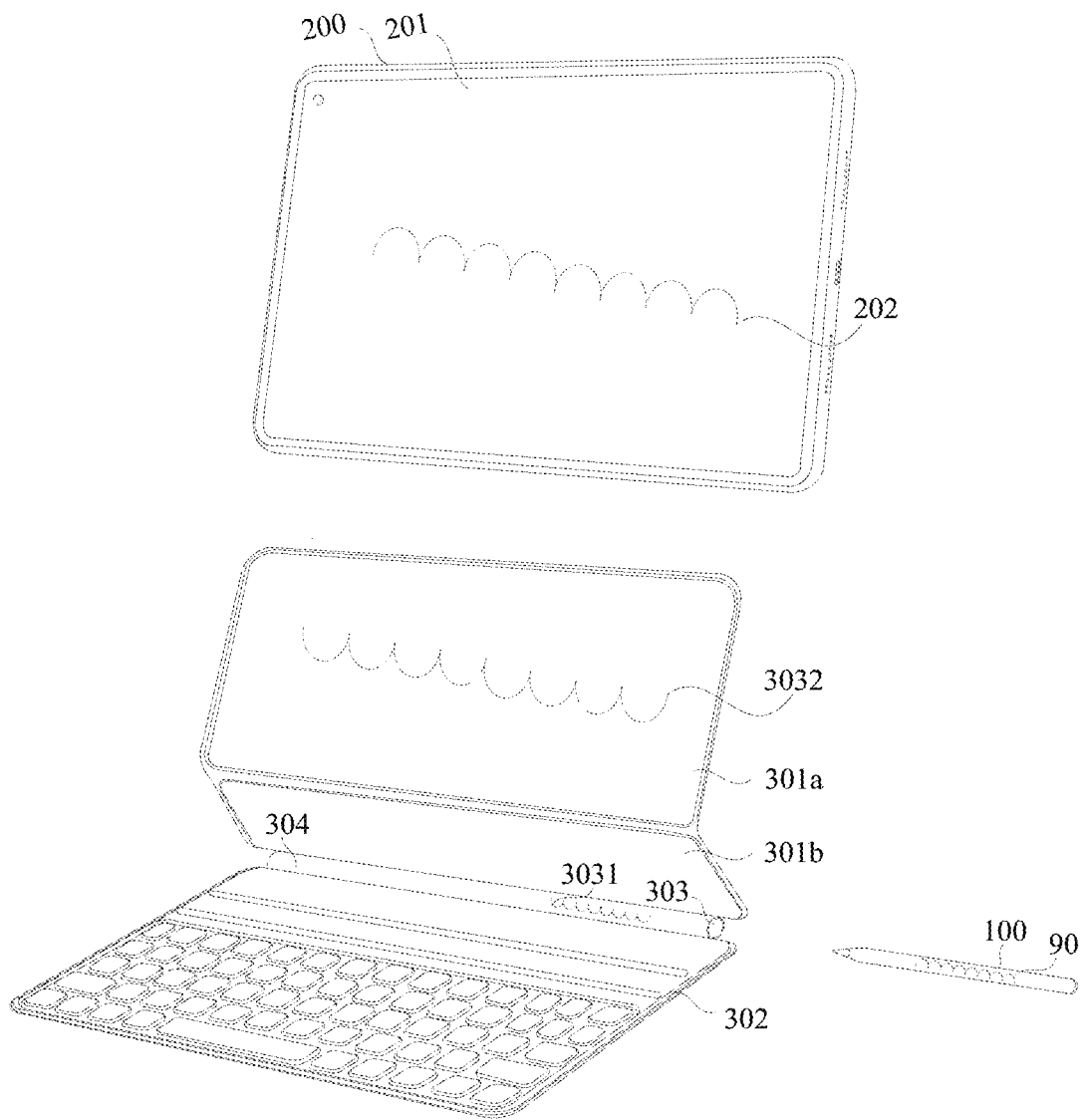
FIG. 10B is a schematic diagram of a structure of a stylus, a wireless keyboard, and an electronic device according to an embodiment of this application.

In an embodiment, referring to FIG. 10B, the first support 301a of the wireless keyboard 300 is provided with a third coil 3032, and the electronic device 200 is provided with a fourth coil 202. When the electronic device 200 is placed on the first support 301a, the third coil 3032 overlaps the fourth coil 202, and the electronic device 200 can charge the wireless keyboard 300. In an embodiment, the third coil 3032 is included in the wireless charging coil 350 shown in FIG. 8. In an embodiment, the third coil 3032 may be connected to the processor 310. The fourth coil 202 is included in the power subsystem 240 shown in FIG. 7, and may be connected to the processor 210. It should be understood that, for the first coil 90 in the stylus 100 and the second coil 3031 in the wireless keyboard 300 shown in FIG. 10B, refer to the related descriptions in FIG. 10A. A coil is represented by an arc dashed line in both FIG. 10A and FIG. 10B.

The pairing method for a stylus and an electronic device provided in this embodiment of this application is described below with reference to specific embodiments. The following embodiments may be mutually combined, and same or similar concepts or processes may not be repeatedly described in some embodiments.

Figure 11:
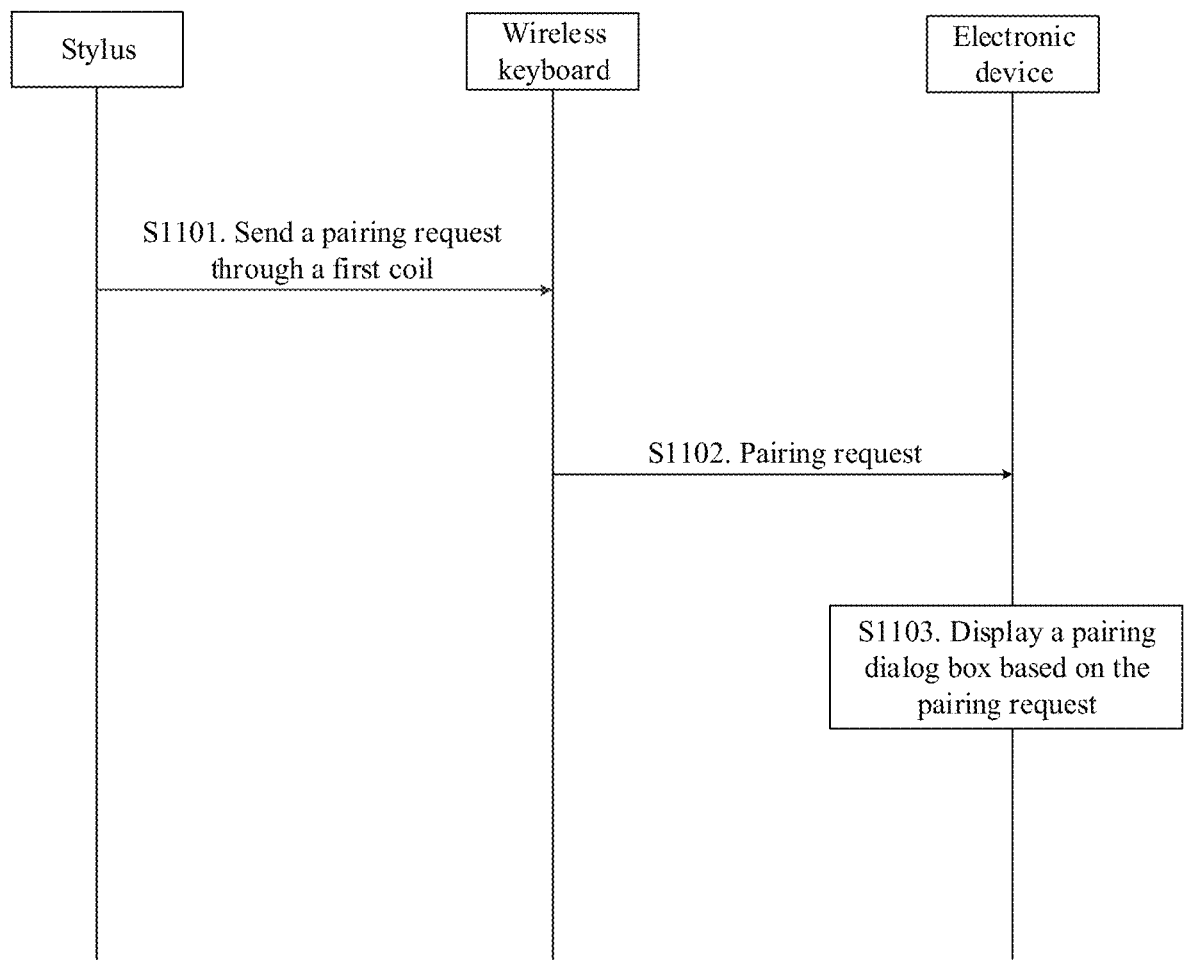
FIG. 11 is a schematic flowchart of an embodiment of a pairing method for a stylus and an electronic device according to an embodiment of this application.

FIG. 11 is a schematic flowchart of an embodiment of a pairing method for a stylus and an electronic device according to an embodiment of this application. As shown in FIG. 11, the pairing method for a stylus and an electronic device may include the following steps.

S1101. A stylus sends a pairing request to a wireless keyboard through a first coil and a second coil.

Referring to the related descriptions of FIG. 8, an alternating current exists in the second coil of the wireless keyboard, and the second coil may generate an alternating electromagnetic field based on the alternating current. Referring to FIG. 5A, after the stylus is accommodated in the accommodating portion of the wireless keyboard, based on an electromagnetic induction principle, the first coil can sense the alternating electromagnetic field generated by the second coil, and an induced current is generated in the first coil, so that electric energy can be transmitted from the wireless keyboard to the stylus, and the wireless keyboard can charge the stylus.

When the wireless keyboard charges the stylus, the stylus may send the pairing request to the wireless keyboard through the first coil, and the wireless keyboard may receive the pairing request from the first coil through the second coil. The pairing request is used to instruct an electronic device to output a pairing dialog box. In an embodiment, the pairing request may include an identifier of the stylus. The identifier is used to uniquely represent the stylus. For example, the identifier of the stylus may be a MAC address of the stylus, that is, the pairing request may include the MAC address of the stylus. In an embodiment, the pairing request may further include a model of the stylus, factory information, and the like. The factory information may include a production batch and manufacturer information of the stylus.

Figure 12:
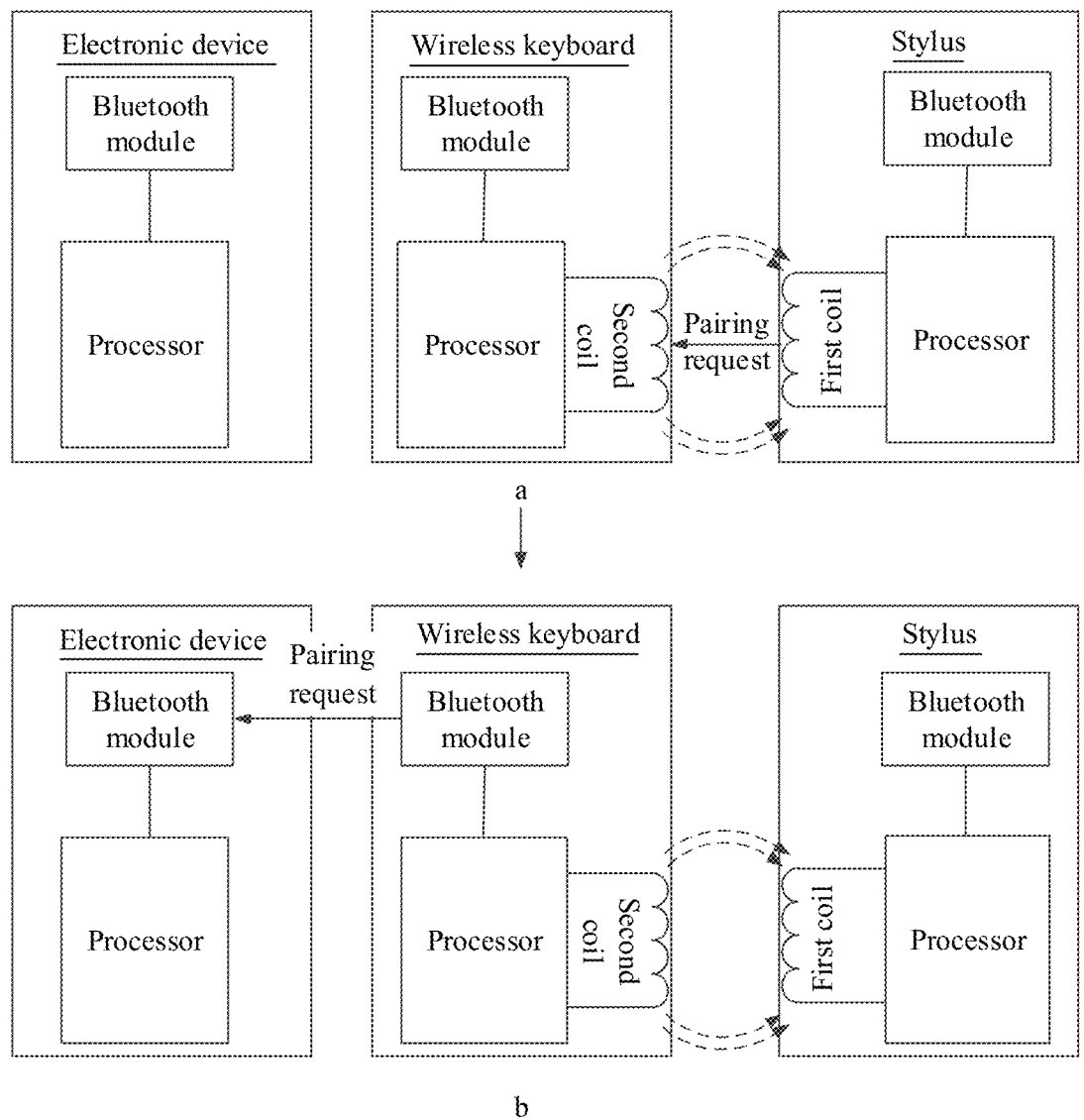
FIG. 12 is a schematic diagram of interaction between an electronic device, a stylus, and a wireless keyboard according to an embodiment of this application.

In an embodiment, referring to a of FIG. 12, a processor in the stylus is configured to control the first coil to send the pairing request to the wireless keyboard in response to that the wireless keyboard charges the stylus. A dashed line is used to represent transmission of electric energy in a of FIG. 12. In a of FIG. 12, the processor and a Bluetooth module in the stylus may be respectively understood as the processor 110 and the Bluetooth module 180 in FIG. 6 above; a processor and a Bluetooth module in the wireless keyboard may be respectively understood as the processor 310 and the wireless communication module 370 in FIG. 8 above; and a processor and a Bluetooth module in the electronic device may be respectively understood as the processor 210 and the wireless interface 260 in FIG. 7 above. It should be understood that, in FIG. 12, the wireless communication module 370 is used as an example of the Bluetooth module in the wireless keyboard, and the wireless interface 260 is used as an example of the Bluetooth module in the electronic device. In an embodiment, the Bluetooth modules in FIG. 12 each may be replaced with another wireless communication module.

In an embodiment, the stylus may communicate with the wireless keyboard based on a Qi protocol. Currently, based on a wireless charging mode of the Qi protocol, a process in which the wireless keyboard charges the stylus may include three stages, which are sequentially a ping stage, an identification and configuration stage, and an electric energy transmission stage. At each stage, data packets may be exchanged between the stylus and the wireless keyboard. For example, at the ping stage, a signal strength data packet and a transmission termination data packet may be exchanged between the stylus and the wireless keyboard. At the identification and configuration stage, a configuration data packet, an identity data packet, and a transmission termination data packet may be exchanged between the stylus and the wireless keyboard. At the electric energy transmission stage, a control error data packet and a received power packet may be exchanged between the stylus and the wireless keyboard. For the data packets at each stage, refer to related descriptions of the current Qi protocol. In an embodiment, the stylus may include the pairing request in a data packet at any stage in the foregoing charging process.

In an embodiment, the data packet at any stage in the charging process may include a preamble portion, a header portion, a data portion, and a checksum portion. For example, the stylus may include the pairing request in the data portion of the data packet. The data portion may carry the pairing request in a form of a field, for example, the field may be "11:22:33:44:55:66", to represent the MAC address of the stylus.

In an embodiment, the stylus may communicate with the wireless keyboard based on a private protocol. A process in which the stylus communicates with the wireless keyboard based on the private protocol may include a handshake stage and a pairing stage. At the handshake stage and the pairing stage, the stylus may exchange data packets with the wireless keyboard. The stylus may include the pairing request in a data packet at any stage of the communication. For example, the data packet at any stage of the communication may include a header (header) portion, a command (command) portion, and a data (data) portion. For example, the stylus may include the pairing request in the data portion of the data packet, and the data portion may carry the pairing request in a form of a field.

In an embodiment, in response to that the wireless keyboard charges the stylus, the stylus may obtain a status of connection between the stylus and the electronic device. The connection status represents whether the stylus is wirelessly connected to the electronic device. In an embodiment, in response to that the wireless keyboard charges the stylus, the stylus may detect whether the stylus is connected to the electronic device, to further obtain the connection status. Alternatively, the electronic device may detect the connection status, and if the electronic device is already wirelessly connected to the stylus, the electronic device may send the connection status to the stylus. If the electronic device is not wirelessly connected to the stylus, the electronic device may broadcast the connection status, so that the stylus receives the connection status. For example, the electronic device broadcasts the connection status through a Bluetooth channel, and the stylus may receive the connection status. An example in which a wireless connection between the stylus and the electronic device is a Bluetooth connection is used for description in the following embodiments.

If the stylus detects that the stylus is already connected to the electronic device over Bluetooth, when the wireless keyboard charges the stylus, the stylus may not send the pairing request to the wireless keyboard.

In an embodiment, a pairing button may be provided on the stylus. The pairing button is configured to trigger the stylus to send the pairing request. When the wireless keyboard charges the stylus, if the stylus is not connected to the electronic device over Bluetooth and the stylus detects that the user operates the pairing button, the stylus may send the pairing request to the wireless keyboard through the first coil.

In an embodiment, after the stylus is historically paired with and connected to the electronic device, the stylus may store information about the electronic device. The information about the electronic device may include, but is not limited to, a MAC address of the electronic device. It should be understood that, in a process in which the stylus is historically paired with and connected to the electronic device, the electronic device may feed back the MAC address of the electronic device to the stylus. When the wireless keyboard charges the stylus, if the stylus is not connected to the electronic device over Bluetooth, the stylus may determine, based on the information about the electronic device, whether to send the pairing request to the wireless keyboard through the first coil. When the wireless keyboard charges the stylus, the stylus may send a connection request to the electronic device based on the stored MAC address of the electronic device. If the stylus can receive a connection response from the electronic device, the stylus may establish a connection to the electronic device, and the stylus does not send the pairing request to the wireless keyboard. If the stylus does not receive a connection response from the electronic device, the stylus determines that the stylus needs to be paired with and connected to the electronic device again, and the stylus may send a pairing request to the wireless keyboard through the first coil.

S1102. The wireless keyboard sends the pairing request to the electronic device.

The pairing request is used to instruct the wireless keyboard to send the pairing request to the electronic device. To be specific, when receiving the pairing request from the stylus the wireless keyboard may forward the pairing request to the electronic device.

For structures of the wireless keyboard and the electronic device, refer to the illustration in FIG. 10A. In an embodiment, the wireless keyboard is already in a connection (for example, a Bluetooth connection) for wireless communication to the electronic device in advance. Because the pairing request from the stylus may be sent based on the Qi protocol or another private protocol, a data packet format for carrying the pairing request is a data packet format supported by the Qi protocol or another private protocol. To enable the electronic device to identify the pairing request from the wireless keyboard, the wireless keyboard may convert, based on a manner of connection between the wireless keyboard and the electronic device, a format of a data packet from the stylus into a format of a data packet that can be identified by the electronic device. In an embodiment, if the wireless keyboard is connected to the electronic device over Bluetooth in advance, the wireless keyboard may convert the data packet from the stylus into a Bluetooth data packet that can be identified by the electronic device, so as to further send a Bluetooth data packet carrying the pairing request to the electronic device. In an embodiment, the wireless keyboard may parse the data packet carrying the pairing request from the stylus, to obtain the MAC address of the stylus, the model of the stylus, the factory information, and the like. The wireless keyboard may encapsulate the MAC address of the stylus, the model of the stylus, and the factory information into a data packet in Bluetooth format.

Referring to b of FIG. 12, the wireless keyboard may receive the pairing request from the stylus based on the second coil, the processor in the wireless keyboard may send the pairing request to the electronic device by using the Bluetooth module in the wireless keyboard, and the electronic device may receive the pairing request based on the Bluetooth module in the electronic device. It should be understood that, when the wireless keyboard sends the pairing request to the electronic device, as illustrated in b of FIG. 12, the wireless keyboard may charge the stylus. Accordingly, the user may alternatively remove the stylus from the accommodating portion, and the wireless keyboard in b of FIG. 12 may not charge the stylus.

For structures of the wireless keyboard and the electronic device, refer to the illustration in FIG. 10B. In an embodiment, when the electronic device is placed in a support B of the wireless keyboard, the electronic device may transmit electric energy to the third coil through the fourth coil, or the wireless keyboard may transmit electric energy to the fourth coil through the third coil. For details, refer to a wireless charging principle of the wireless keyboard in FIG. 8. In this embodiment, when the wireless keyboard receives the pairing request from the stylus, the wireless key board may not process the pairing request, but directly send the pairing request to the electronic device through the third coil. For example, the wireless keyboard may send, to the electronic device through the third coil by using the Qi protocol or another private protocol, the data packet carrying the pairing request from the stylus. For details, refer to the related descriptions in which the stylus sends the pairing request to the wireless keyboard through the first coil.

Figure 13:
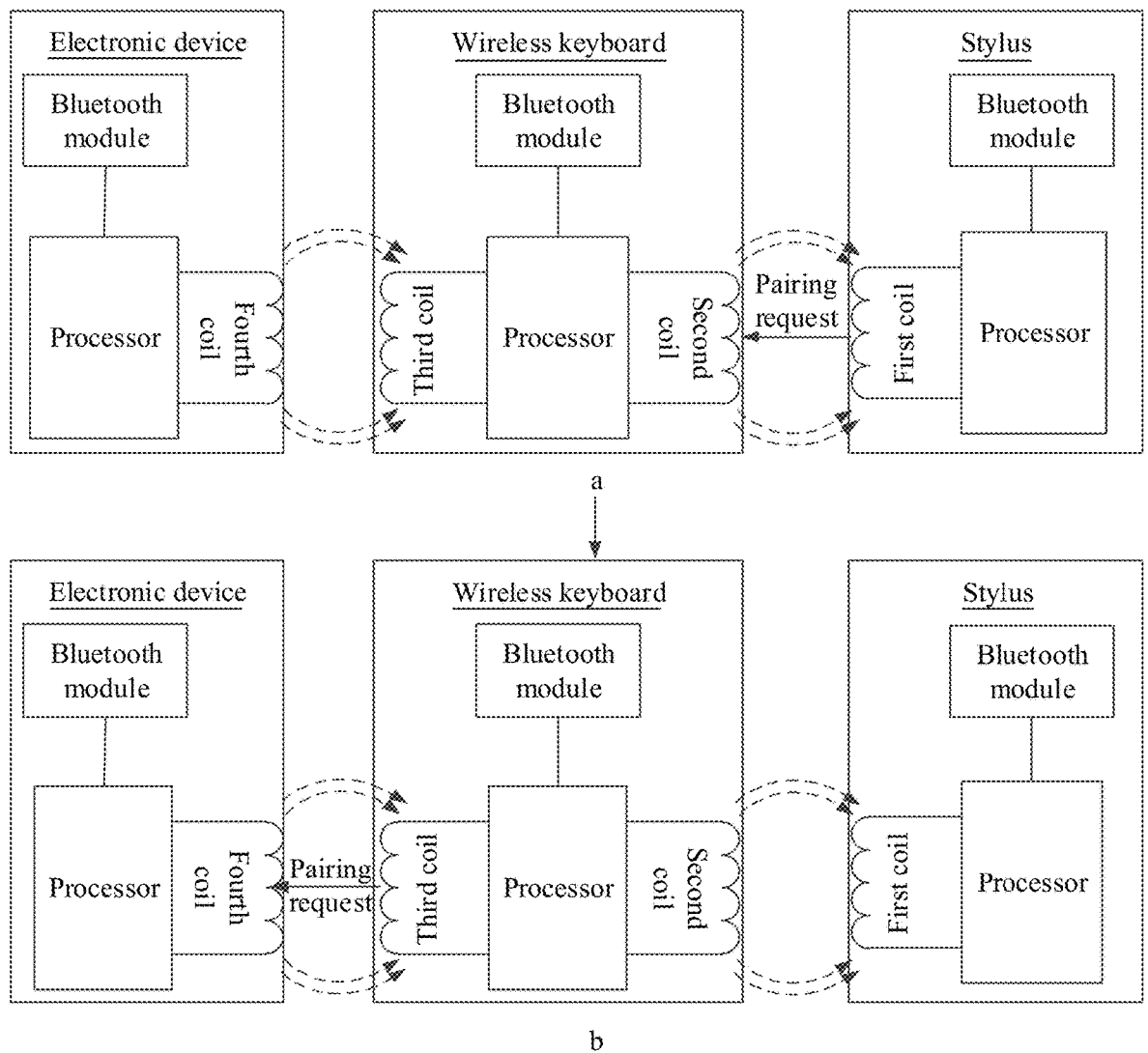
FIG. 13 is a schematic diagram of interaction between an electronic device, a stylus, and a wireless keyboard according to an embodiment of this application.

Referring to b of FIG. 13, the wireless keyboard may receive the pairing request from the stylus based on the second coil, the processor in the wireless keyboard may send the pairing request to the electronic device through the third coil, and the electronic device may receive the pairing request based on the fourth coil. For a in FIG. 13, refer to the related descriptions of a in FIG. 12.

Compared with that in FIG. 12 and FIG. 13, the wireless keyboard can be used as an intermediate apparatus to forward the pairing request from the stylus to the electronic device. Compared with FIG. 13, in FIG. 12, the electronic device in FIG. 12 can forward the pairing request from the stylus to the electronic device, without being placed on the support B of the wireless keyboard.

S1103. The electronic device displays a pairing dialog box based on the pairing request.

The electronic device receives the pairing request from the wireless keyboard, and may parse the pairing request to obtain the MAC address of the stylus.

Figure 14:
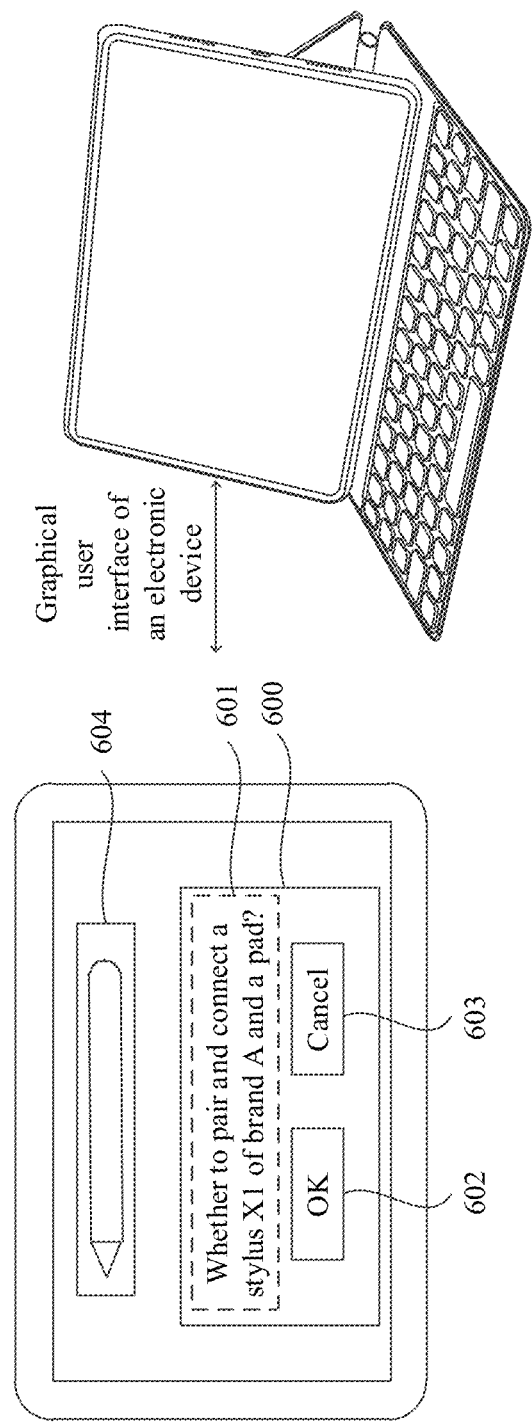
FIG. 14 is a schematic diagram of a graphical user interface of an electronic device according to an embodiment of this application.

In an embodiment, the electronic device receives, based on Bluetooth, the pairing request forwarded from the wireless keyboard, or the electronic device receives, based on the fourth coil, the pairing request forwarded from the wireless keyboard, and the electronic device has enabled Bluetooth. When the electronic device can parse the pairing request to obtain the MAC address of the stylus, the electronic device may display a pairing dialog box 600. The pairing dialog box is used to remind the user that there is a stylus to be paired. As shown in FIG. 14, a graphical user interface of the electronic device may display prompt information 601 indicating whether to pair with the stylus, and an "OK" control 602 and a "Cancel" control 603. A form of the pairing dialog box displayed by the electronic device is not limited in this embodiment of this application.

In an embodiment, the electronic device may output pairing information based on the pairing request. A manner of outputting the pairing information may be, but is not limited to, displaying the pairing dialog box, or prompting, in a voice manner, the user to trigger the electronic device and the stylus to perform pairing. A manner of outputting the pairing information by the electronic device is not limited in this embodiment of this application.

In an embodiment, if the electronic device receives, based on the fourth coil, the pairing request forwarded from the wireless keyboard, the electronic device may detect, upon receiving the pairing request, whether the electronic device enables Bluetooth. "Whether the electronic device enables Bluetooth" may be understood as whether a Bluetooth function is enabled. If the electronic device does not enable Bluetooth, the electronic device may display a dialog box 500 shown in FIG. 15 for prompting the user to enable Bluetooth, to prompt the user to enable Bluetooth on the electronic device. After the user enables Bluetooth on the electronic device, the electronic device may display the graphical user interface shown in FIG. 14. For details, refer to the related descriptions above. It should be understood that. "Bluetooth" in this embodiment of this application is an example for description, and may be replaced with another wireless connection function or a wireless connection mode.

Figure 15:
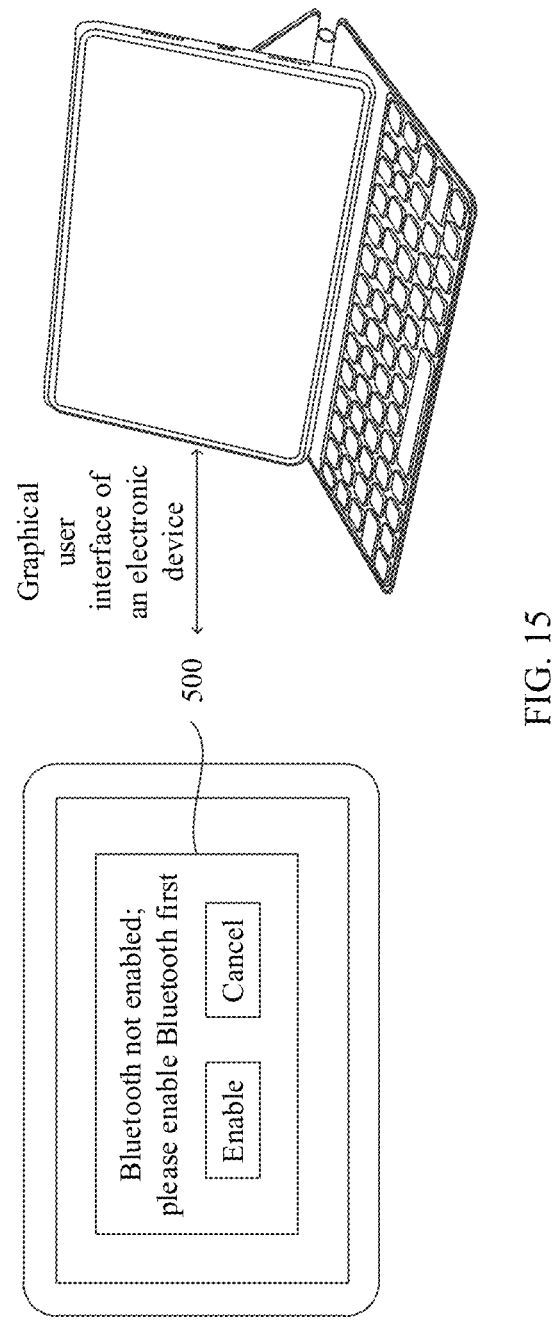
FIG. 15 is a schematic diagram of another graphical user interface of an electronic device according to an embodiment of this application.

In an embodiment, when the pairing request includes the model of the stylus and the factory information, the electronic device may obtain an image of the stylus based on the model of the stylus, and may further display an image 604 of the stylus when displaying the pairing dialog box. In an embodiment, the electronic device may store a mapping relationship between a model and an image of a stylus. The mapping relationship may include different models of styluses and an image of the stylus of each model. The electronic device may obtain the image of the stylus based on the model of the stylus and the mapping relationship. In an embodiment, the electronic device may further determine a manufacturer identifier based on the factory information, and further display the manufacturer identifier when displaying the pairing dialog box. In FIG. 15, brand A may represent the manufacturer identifier and X1 may represent the model of the stylus.

When the pairing dialog box is displayed on the graphical user interface of the electronic device, the user may operate the "OK" control to trigger the electronic device and the stylus to perform pairing. In an embodiment, the electronic device and the stylus may be paired and connected based on a Bluetooth manner. Details are not described in this embodiment of this application. For details, refer to related descriptions of existing pairing and connection.

In the pairing method for a stylus and an electronic device provided in this embodiment of this application, the stylus may send the pairing request to the wireless keyboard through the first coil, the wireless keyboard may forward the pairing request to the electronic device, and the electronic device displays the pairing dialog box based on the pairing request. In this embodiment of this application, the stylus uses the wireless keyboard as an intermediate apparatus for pairing the electronic device with the stylus, and the wireless keyboard may transmit the pairing request from the stylus to the electronic device, so that the electronic device displays the dialog box and the electronic device can be paired with the stylus. Because the stylus can transmit the MAC address of the stylus to the electronic device by using the wireless keyboard, to achieve a purpose of directionally transmitting the MAC address of the stylus to the electronic device, other electronic devices around the stylus each can be prevented from displaying a dialog box, thereby improving user experience.

An embodiment of this application further provides a stylus shown in FIG. 6. A processor in the stylus may read a program stored in a memory to execute the actions performed by the stylus in the foregoing pairing method. It should be understood that the memory is not shown in FIG. 6.

An embodiment of this application further provides an electronic device shown in FIG. 7. A processor in the electronic device may read a program stored in a memory to execute the actions performed by the electronic device in the foregoing pairing method. It should be understood that the memory is not shown in FIG. 7.

An embodiment of this application further provides a wireless keyboard shown in FIG. 8. A processor in the wireless keyboard can read a program stored in a memory to execute the actions performed by the wireless keyboard in the foregoing pairing method. It should be understood that the memory is not shown in FIG. 8.

An embodiment of this application further provides a pairing system including a stylus shown in FIG. 6, an electronic device shown in FIG. 7, and a wireless keyboard shown in FIG. 8. The pairing system can perform the pairing method in the foregoing embodiments. The stylus can execute the actions performed by the stylus in the foregoing pairing method. The electronic device can execute the actions performed by the electronic device in the foregoing pairing method. The wireless keyboard can execute the actions performed by the wireless keyboard in the foregoing pairing method.

The term "a plurality of" in this specification refers to two or more. The term "and/or" in this specification describes only an association relationship for describing associated objects and represents that three relationships can exist. For example, "A and/or B" can represent the following three cases: Only A exists, both A and B exist, and only B exists. In addition, the character "/" in this specification generally indicates an "or" relationship between the associated objects. In a formula, the character "/" indicates that the associated objects are in a "division" relationship.

It can be understood that, in the embodiments of this application, various numeric numbers are distinguished merely for ease of description and are not used to limit the scope of the embodiments of this application, It can be understood that, in the embodiments of this application, a sequence number of each of the foregoing processes does not mean a sequence of execution. The sequence of execution of the processes should be determined based on functions and internal logic of the processes, and no limitation should be imposed on an implementation process of the embodiments of this application.

What is claimed is:

1. A pairing method, applied to a pairing system, wherein the pairing system comprises a stylus, a wireless keyboard, and an electronic device, the stylus comprises a first coil, the wireless keyboard comprises a second coil, and the method comprises:
    in response to that the wireless keyboard charges the stylus through the second coil and the first coil, sending, by the stylus, a pairing request which is transmitted through the first coil and the second coil to the wireless keyboard;
    sending, by the wireless keyboard, the pairing request to the electronic device; and
    displaying, by the electronic device, a pairing dialog box based on the pairing request, wherein the pairing dialog box is used to prompt a user to trigger the electronic device and the stylus to perform pairing.

2. The method according to claim 1, wherein before the sending, by the stylus, the pairing request to the wireless keyboard through the first coil and the second coil, the method further comprises:
    obtaining, by the stylus, a status of connection between the stylus and the electronic device; and
    the sending the pairing request to the wireless keyboard comprises:
    in response to that the stylus is not connected to the electronic device, sending, by the stylus, the pairing request to the wireless keyboard through the first coil and the second coil.

3. The method according to claim 2, wherein the obtaining, by the stylus, the status of connection between the stylus and the electronic device comprises:
    detecting, by the stylus, a connection status.

4. The method according to claim 2, wherein the obtaining, by the stylus, the status of connection between the stylus and the electronic device comprises:
    detecting, by the electronic device, a connection status, and broadcasting the connection status; and
    receiving, by the stylus, the connection status.

5. The method according to claim 1, wherein that the wireless keyboard charges the stylus through the second coil and the first coil comprises:
    charging, by the wireless keyboard, the stylus based on a wireless protocol through the second coil and the first coil; and
    the sending the pairing request to the wireless keyboard comprises:
    sending, by the stylus, the pairing request to the wireless keyboard based on the wireless protocol.

6. The method according to claim 5, wherein the pairing request is comprised in any data packet exchanged between the stylus and the wireless keyboard based on the wireless protocol.

7. The method according to claim 1, wherein the pairing request comprises a media access control MAC address of the stylus.

8. The method according to claim 7, wherein the wireless keyboard is in a connection for wireless communication to the electronic device; and before the sending, by the wireless keyboard, the pairing request to the electronic device, the method further comprises:
    parsing, by the wireless keyboard, the pairing request to obtain the MAC address of the stylus;
    encapsulating the MAC address in a data packet in a format for the wireless communication; and
    the sending, by the wireless keyboard, the pairing request to the electronic device comprises:
    sending, by the wireless keyboard, the data packet in the format for the wireless communication to the electronic device.

9. The method according to claim 1, wherein the wireless keyboard comprises a third coil, the electronic device comprises a fourth coil, the electronic device charges the wireless keyboard through the fourth coil and the third coil, and the sending, by the wireless keyboard, the pairing request to the electronic device comprises:
    sending, by the wireless keyboard, the pairing request to the electronic device through the third coil and the fourth coil.

10. The method according to claim 9, wherein the sending the pairing request to the electronic device comprises:
    sending, by the wireless keyboard, the pairing request to the electronic device based on a wireless protocol.

11. The method according to claim 10, wherein the pairing request is comprised in any data packet exchanged between the wireless keyboard and the electronic device based on the wireless protocol.

12. The method according to claim 9, wherein the method further comprises:
    detecting, by the electronic device in response to receiving the pairing request from the wireless keyboard, whether the electronic device enables a wireless communication function; and
    if the electronic device does not enable the wireless communication function, outputting, by the electronic device, a prompt dialog box, wherein the prompt dialog box is used to prompt the user to enable the wireless communication function of the electronic device.

13. A pairing system, comprising:
a stylus having a first coil;
a wireless keyboard having a second coil; and
an electronic device, wherein
in response to that the wireless keyboard charges the stylus through the second coil and the first coil, the stylus sends a pairing request which is transmitted through the first coil and the second coil to the wireless keyboard,
the wireless keyboard sends the pairing request to the electronic device, and
the electronic device displays a pairing dialog box based on the pairing request, wherein the pairing dialog box is used to prompt a user to trigger the electronic device and the stylus to perform pairing.

14. The system according to claim 13, wherein before sending the pairing request to the wireless keyboard through the first coil and the second coil, the stylus is configured to obtain a status of connection between the stylus and the electronic device, and
wherein in response to that the stylus is not connected to the electronic device, the stylus sends the pairing request to the wireless keyboard through the first coil and the second coil.

15. The system according to claim 14, wherein the stylus is configured to detect a connection status.

16. The system according to claim 14, wherein in obtaining the status of connection between the stylus and the electronic device,
the electronic device is configured to detect a connection status, and broadcast the connection status, and
the stylus is configured to receive the connection status.

17. The system according to claim 13, wherein in charging the stylus through the second coil and the first coil,
the wireless keyboard is configured to charge the stylus based on a wireless protocol through the second coil and the first coil; and
the stylus is configured to send the pairing request to the wireless keyboard based on the wireless protocol.

18. The system according to claim 17, wherein the pairing request is comprised in any data packet exchanged between the stylus and the wireless keyboard based on the wireless protocol.

19. The system according to claim 13, wherein the pairing request comprises a media access control (MAC) address of the stylus.

20. The system according to claim 19, wherein the wireless keyboard is in a connection for wireless communication to the electronic device; and before sending the pairing request to the electronic device,
the wireless keyboard parses the pairing request to obtain the MAC address of the stylus, wherein the MAC address is encapsulated in a data packet in a format for the wireless communication; and
wherein sending the pairing request to the electronic device comprises sending the data packet in the format for the wireless communication to the electronic device.

* * * * *